Figure 4:
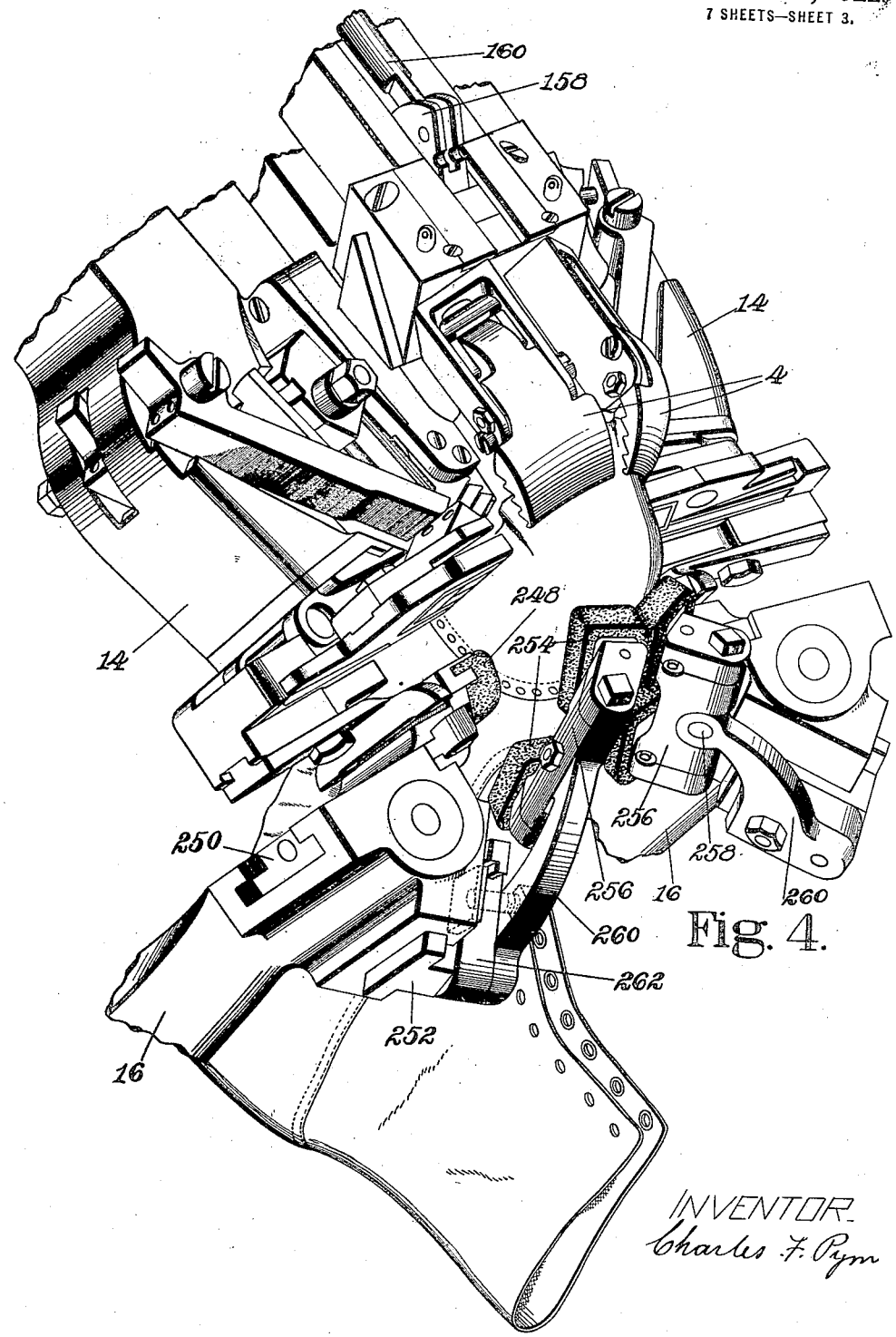

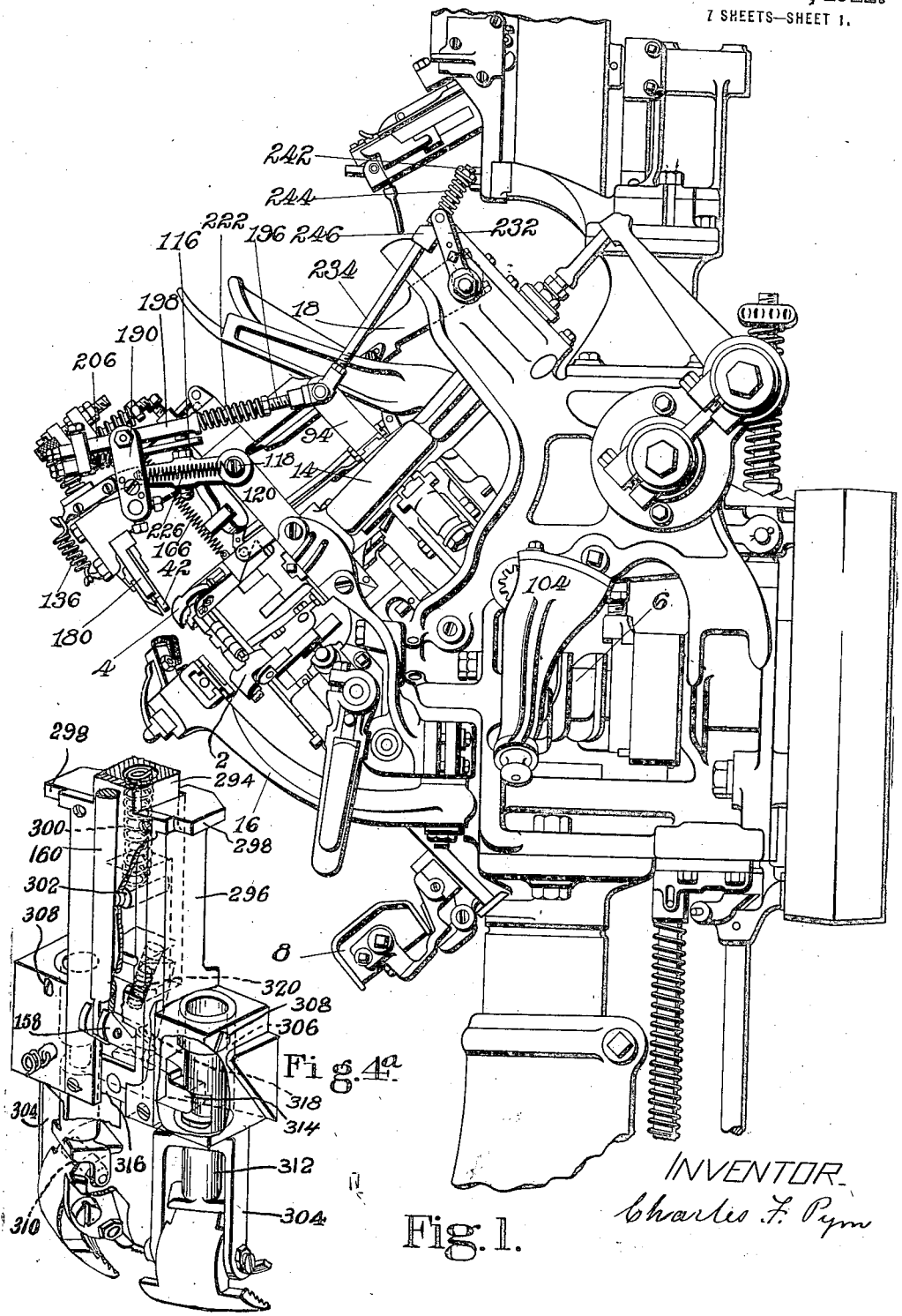

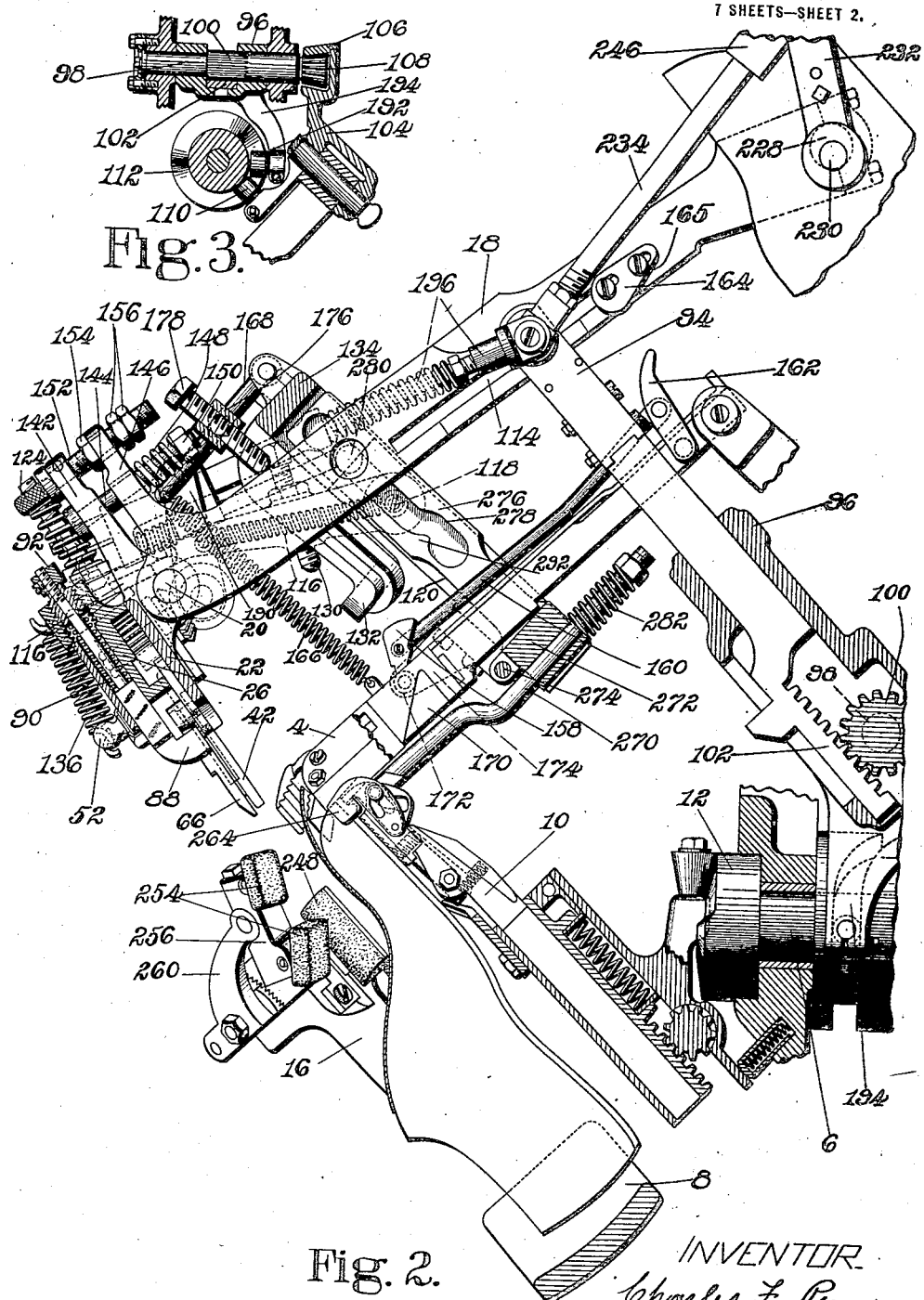

INVENTOR
Charles F. Pym

C. F. PYM.
MACHINE FOR WORKING UPPERS OVER LASTS.
APPLICATION FILED AUG. 15, 1917.

1,436,194.

Patented Nov. 21, 1922.

7 SHEETS—SHEET 6.

INVENTOR
Charles F. Pym

INVENTOR.
Charles F. Pym.

Patented Nov. 21, 1922.

1,436,194

UNITED STATES PATENT OFFICE.

CHARLES F. PYM, OF LYNN, MASSACHUSETTS, ASSIGNOR, BY MESNE ASSIGNMENTS, TO UNITED SHOE MACHINERY CORPORATION, OF PATERSON, NEW JERSEY, A CORPORATION OF NEW JERSEY.

MACHINE FOR WORKING UPPERS OVER LASTS.

Application filed August 15, 1917. Serial No. 186,314.

*To all whom it may concern:*

Be it known that I, CHARLES F. PYM, a subject of the King of Great Britain, residing in Lynn, in the county of Essex and State of Massachusetts, have invented certain Improvements in Machines for Working Uppers Over Lasts, of which the following description, in connection with the accompanying drawings, is a specification, like reference characters on the drawings indicating like parts in the several figures.

This invention relates to machines for working uppers over lasts. The invention is herein shown as embodied in a machine in which the over-working means comprises means for pulling over the upper and means for lasting the toe portion of the shoe; but the invention in many of its features is not limited to machines for performing both pulling-over and lasting operations. The operation of the machine herein shown is illustrated, moreover, by reference to a welt shoe; but it should be understood that the invention is likewise applicable to the manufacture of turn shoes or shoes of other types, and the term "sole," as hereinafter used for convenience, is to be understood, except where the context requires a different interpretation, as referring in general to the insole of a welt or other type of shoe or to the sole of a turn shoe.

It has been proposed heretofore, as shown for example in United States Letters Patent No. 1,135,950, granted on April 13, 1915, upon an application of R. F. McFeely, to provide in a unitary machine means automatically operative for pulling-over the upper and then for lasting an end of the shoe. An important object, among others, of this invention is to provide a pulling-over and lasting machine so organized as to secure improved results in the operation of the machine upon the shoe.

In combined pulling-over and lasting machines, and especially in machines having means for performing the lasting operation automatically following the pulling-over operation, practically successful results require a careful correlation between the pulling-over means and the lasting means and between both these means and the means for positioning the shoe. If the lasting means does not operate with sufficient overlaying pressure on the bottom of the shoe, the upper will not be closely conformed to the margin of the sole and the pulling-over tension of the upper materials may be disadvantageously relaxed before the materials are secured in lasted position; and a similar objectionable result may follow if the operations of the lasting means and the pulling-over means are not properly co-ordinated to cause the lasting means to assume effective control of the upper before the upper is released by the pulling-over means. On the other hand, if the lasting means is forced inwardly too near the plane of the shoe bottom, the upper may be damaged and the edge of the sole may be forced back from the edge of the last, or doubled over, by the pressure of the lasting means, and the upper will not be wiped evenly and uniformly over the margin of the sole. If the shoe, moreover, is not positioned at the correct distance from the lasting means, automatically operated wipers can not be relied upon to advance far enough over the shoe, or may wipe over too far and damage the rib or shoulder of the sole. All these difficulties are increased by reason of the wide variation in the shapes and sizes of shoes.

As contributing to improved results in the operation of pulling-over and lasting machines, this invention provides a novel organization of pulling-over and lasting mechanism in which effectiveness in the operation of the lasting means upon the shoe is insured without danger of damaging the shoe or of unduly relaxing the pulling-over tension. In accordance with an important feature of the invention the lasting means in an automatic pulling-over and lasting machine organization is operated in such relation to the pulling-over means and to the plane of the shoe bottom as to assume control of the tensioned upper and wipe it over the edge of the sole with sufficient clearance between the lasting means and the sole, to avoid displacing the margin of the sole or other damage to the shoe, and while positioned over the margin of the sole is rendered effective by relative movements of said means and the last to press the upper firmly into lasted position and shape the upper upon said margin. As I am advised, it is broadly new in an automatic organization of pulling-over mechanism and lasting mechanism to provide means for automatically pressing the upper firmly against the feather of the sole after the upper has been wiped over the edge with safe clearance.

Further insurance against operating too close to the plane of the shoe bottom at the toe end of the shoe when the lasting wipers close over the shoe is afforded in the illustrative machine herein shown by causing the wipers to be inclined toward the shoe bottom from the toe end rearwardly when they are positioned over the shoe; and with the ends of the wipers thus positioned relatively close to the sole increased pressure will be brought to bear to press the upper upon the margin of the sole at the sides of the shoe where ordinarily toe wipers are least effective, this result being particularly advantageous also in connection with novel binder applying means of this invention, as will be hereinafter explained.

Another feature of the invention consists in a novel construction and arrangement of overlaying means and operating mechanism whereby said means is rendered effective to press the margin of the upper against the sole in overlaid position, the overlaying means herein shown comprising end embracig wipers; and still another feature resides in a novel construction affording provision for adjustment of the overlaying means relatively, to the plane of the shoe bottom.

Further features of the invention reside in a novel organization of pulling-over means and overlaying or lasting means including a pulling-over gripper and novel means for controlling the operation of the gripper in co-ordination with operative movement of the overlaying or lasting means. In the construction shown in order to insure against damage through accidental engagement of the lasting means with the toe gripper, the forward pull of the gripper, whereby it tensions the upper lengthwise of the last at the toe end in the manner usual in pulling-over machines of the illustrative type, is effected yieldingly by novel mechanism, thus permitting the gripper to give way if it is engaged by the lasting means; and the machine has means, moreover, for relaxing the forward tension on the gripper as the lasting means moves toward the shoe, thereby permitting the gripper to pull more directly upward from the shoe bottom as the lasting means advances and causing the gripper to be withdrawn farther from the path of movement of the lasting means and also to carry the upper toward the end of the last preparatory to the lasting operation. The machine has also novel means for causing the gripper to release the upper in variably timed relation to the movement of the overlaying or lasting means toward the shoe depending upon the position of the gripper relatively to the plane of the shoe bottom, thus further insuring against interference between the gripper and the lasting means while causing the gripper to retain its hold of the upper as long as practicable before control of the upper is given up to the lasting means, and this means constitutes another feature of the invention.

A further object of the invention is to provide improved means for securing the upper in lasted position. Important features of the invention are to be recognized in novel means for applying a binder to a shoe, novel means for securing the binder in holding relation to the upper, and in a general organization of means for positioning the binder in the correct relation to the shoe and for applying and fastening it to the shoe. In order to secure the binder in place, the machine herein shown has means for forcing the ends of the binder into the shoe materials, thus avoiding the necessity for the use of tacks or other anchoring means for the binder; the machine being thus adapted to carry out the method claimed in prior United States Letters Patent No. 1,406,280 granted upon my application on Feb. 14, 1922.

The machine herein shown is also provided with novel means for engaging the margin of the sole of the shoe to position it in the correct relation to the last, said means in the illustrative machine being constructed and arranged to prevent the margin from being uplifted from the last in the pulling-over operation in such manner as to be turned back from the edge of the last during lasting, this means being useful irrespective of the particular type of the shoe and especially advantageous in the case of turn shoes in which the sole projects beyond the end of the last at the toe end. The machine has also novel means for positioning the work by engagement with the edge face of the sole or with the last, the construction shown being particularly designed to insure the correct lengthwise position of the shoe in the machine by engaging the last or the edge of the sole at the toe end; and features of the invention reside in novel means for positioning the margin of the sole on the last and novel means for positioning the last and the sole in the machine, and also in novel mechanism for operating a positioning member to withdraw it from operative position.

Still other novel features of the invention will be recognized in the organization herein provided for operating the wipers; in a novel construction affording provision for quick detachment of the wipers from their support; in novel shoe supporting means; and in various details of construction and combinations of parts, all of which will now be described with reference to the accompanying drawings and pointed out in the claims.

Figure 5:
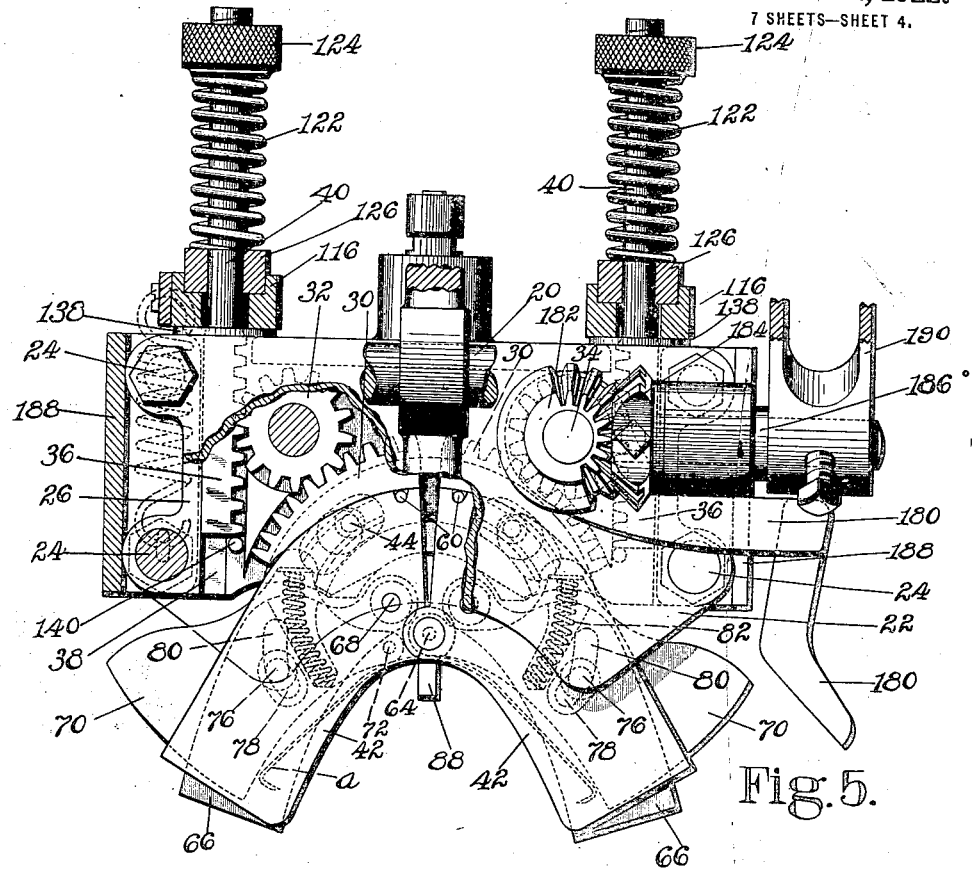
Figure 6:
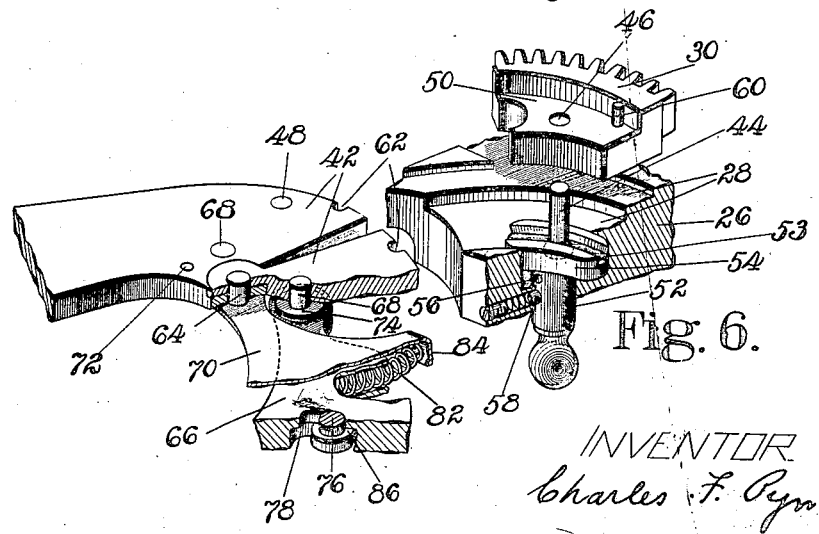
Figure 7:
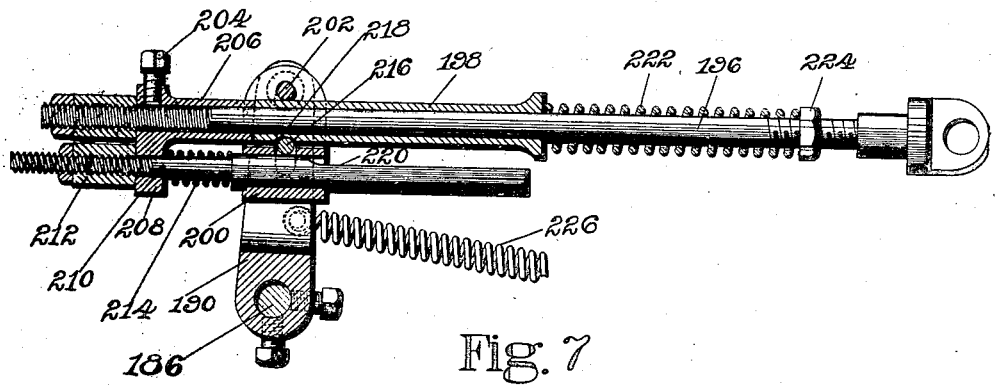
Figure 8:
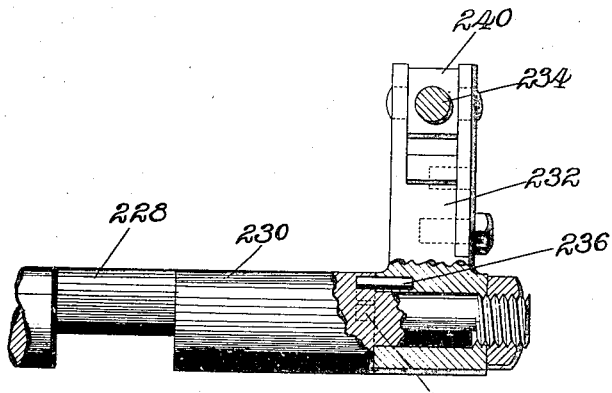
Figure 9:
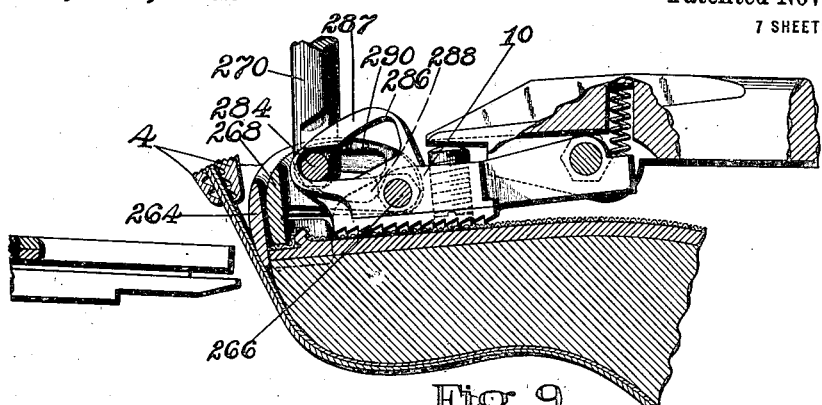
Figure 10:
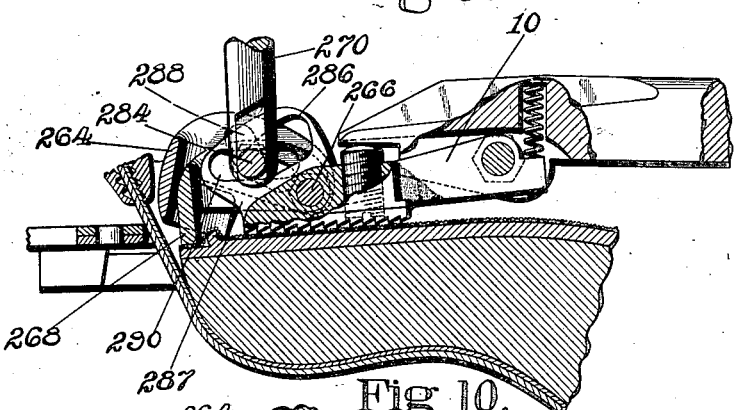
Figure 11:
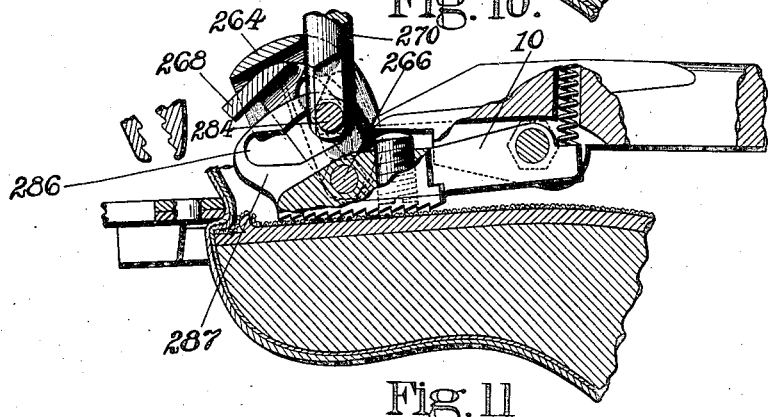
Figure 12:
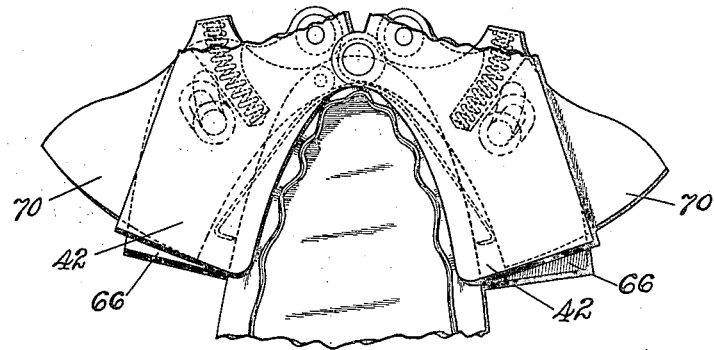
Figure 13:
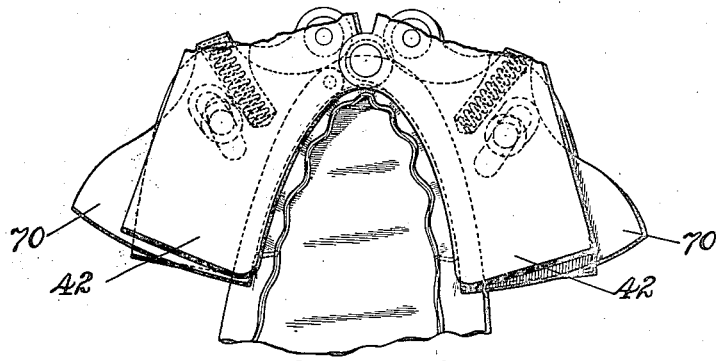
Figure 14:
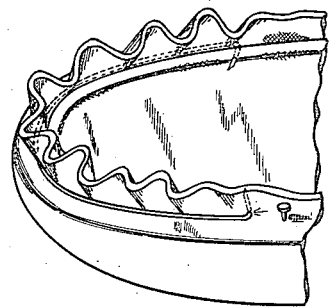
Figure 16:
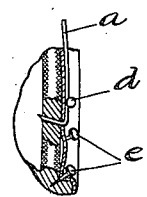
Figure 15:
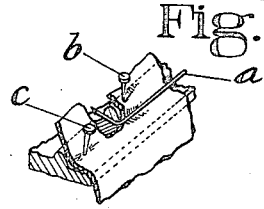

In the drawings:

Fig. 1 is a side elevation of the illustrative machine with the features of this invention embodied therein, Fig. 2 is a view, partly in side elevation and partly in vertical section, of a portion of the machine shown in Fig. 1 with a shoe in position for the pulling-over operation, Fig. 3 is a vertical section in a plane at right angles to the plane of Fig. 2, showing a portion of the operating mechanism, Fig. 4 is a perspective view illustrating the operation upon a shoe of the shoe supporting mechanism and the mechanism for pulling the upper and securing it at the sides of the shoe, Fig. 4ª is a perspective view of a portion of the toe gripper, with parts broken away, Fig. 5 is a plan view, partly in section, of a portion of the toe lasting and binder applying mechanism, Fig. 6 shows in disassembled relation portions of the mechanism shown in Fig. 5, Fig. 7 shows in detail a portion of the binder applying mechanism, Fig. 8 is a detail view of a portion of the means with which the machine is provided for causing the wipers to press the upper on the margin of the sole, Figs. 9, 10 and 11 show in vertical section the means for positioning the margin of the sole and the end of the last and illustrate successive positions of these parts during the operation of the machine, Figs. 12 and 13, considered in connection with Fig. 5, illustrate successive positions of the wipers and the binder applying mechanism in the operation of the machine upon a shoe, Fig. 14 shows the forepart of a shoe after the shoe has been pulled over and lasted by the machine, and Figs. 15 and 16 illustrate different alternative locations of upper holding tacks with reference to the wire binder.

The general features of the type of pulling-over machine herein shown are described in detail in numerous prior United States Letters Patent, including Patent No. 1,135,950, hereinbefore referred to, and Patent No. 1,029,387, granted on June 11, 1912 on an application of R. F. McFeely. Only such portions of the illustrative machine, therefore, as are intimately related to the novel features of this invention will be described herein in detail, and for further information as to the details of construction of the machine reference may be made to the prior patents.

In its general aspects the machine includes side grippers 2 for engaging the margin of the upper at the sides of the forepart and a toe gripper 4 comprising two pairs of jaws curved for engagement with that portion of the upper which is located at the toe end of the shoe, together with yieldable connections between the grippers and the usual operating cams on a cam shaft 6 for imparting operative movements to the grippers in such manner as to pull the upper over the last under yielding tension. The machine includes also a heel rest 8 for the shoe which is given a forward movement in the usual manner into supporting relation to the heel end of the last, and a sole rest 10 which is rocked by a cam 12 on the cam shaft 6 to depress the forepart of the last into the upper simultaneously with a portion of the pulling movement of the grippers. Side arms 14 are provided with the usual means for laying the upper over the margin of the sole at the sides of the shoe and for driving the side tacks to hold the upper in lasted position at the sides, and the machine is provided also with side clamp arms 16 and operating means for clamping the shoe between them and for supporting the shoe against downward pressure in the tack driving operation.

Machines of the illustrative type perform their operations in successive stages between which the machine is at rest to enable the operator to inspect the work and to make such adjustments of different portions of the shoe materials as may be necessary. The number of stops which the machine makes automatically during its cycle of operations upon a shoe depends upon the construction of the controlling cam, and as far as the essential operations upon a shoe are concerned, is largely a matter of choice. For purposes of explanation it will be assumed that the machine herein shown is designed to perform its operations in two stages or steps, the machine making one stop after the upper has been subjected to the pulling tension of the grippers, to enable the operator to inspect the work and adjust the upper relatively to the last for straightening the tip and otherwise insuring the correct location of the upper with respect to the last. When the machine is started the second time the side clamp arms 16 are swung inward to their operative holding position, the side grippers move inward to carry the upper over the margin of the sole, and the side tacker arms 14 move inward to cause the side grippers to release their hold upon the upper and for driving the tacks to secure the upper in position at the sides of the shoe, substantially simultaneously with the overlaying and fastening of the upper at the toe. Following these operations, the shoe is released and the parts are returned to their starting positions.

The above mentioned general features of the construction and operation of the machine differ in no essential respect from the construction and operation of pulling-over machines of this type heretofore in use, and in view of the detailed description in the prior patents to which reference has been made, require no further description. It is during the second stage of the cycle of operations of the machine that the shoe is subjected to the operation of the novel lasting means, including the binder applying means, of this invention, the construction of which will now be described in detail.

The lasting mechanism is carried on an arm 18 which corresponds in location and arrangement with reference to other portions of the machine to the front tacker arm of prior pulling-over machine constructions. This arm is pivoted at its upper end on the frame of the machine by means which will be hereinafter more particularly described. Mounted on a pivot 20 on the lower end of the arm is a plate 22, and secured on the lower side of this plate by screws 24 is a block 26 which serves as a means of support for the wiper mechanism. Mounted for swinging movement in a stepped guideway 28 in the block 26 are a pair of gear segments 30 located at opposite sides of the longitudinal median line of the mechanism, these gear segments engaging pinions 32 which engage in turn racks 36 mounted to slide in guideways 38 in the block 26 and provided with rounded extensions 40 which project outside of the block. The gear segments 30 serve as supports for a pair of wipers 42 for wiping the upper inward over the margin of the sole. These wipers are detachably secured to the segments 30 by means of pins 44 which are arranged to project upward through holes 46 in the segments and into corresponding holes 48 in the wipers which are thus locked in position on the supporting ledges 50 of the gear segments and between these ledges and the plate 22. Convenient means for withdrawing the pins 44 from the holes 48 in such manner as to release the wipers is afforded by larger pins 52 which are mounted in sockets in the lower side of the block 26 and extend below the block to permit them to be pulled downward to withdraw the pins 44. In order to permit the swinging movements of the wipers 42, the connections between the pins 44 and 52 each comprise an arc shaped head 54 on the pin 52 having a dove-tailed guideway 53 in which the lower end portion of the pin 44 is received, this lower end portion of the pin having a flared head to fit in the guideway. The block 26 is provided with sockets to afford provision for the movement of the heads 54 as the pins 52 are moved downwardly or upwardly. In order to retain each pin 52 yieldingly at either of its limits of movement, the pin is provided with cup-shaped sockets 56 for the reception of a spring-pressed ball 58. In order to afford the operator an indication of the correct location of the wipers in the machine to cause the holes 48 to register with the holes 46 in the gear segments 30, the segments carry pins 60 which are arranged for engagement in notches 62 in the edges of the wipers. In introducing the wipes into the machine the operator swings them sidewise until the pins 60 enter the notches 62 and then presses the pins 52 upwardly to cause the pins 44 to enter the holes 48 and lock the wipers in place.

The wiper plates 42 in the construction shown are pivoted together centrally by means of a pin 64 which is located at the center of swinging movement of the gear segments 30. Supported on the lower side of the wipers 42 are shoe embracing plates 66 which are curved for substantial conformity to the lateral contour of the shoe about the toe and along the sides of the forepart and in the operation of the machine are arranged to be closed against the shoe with their upper surfaces substantially in the plane of the surface of that portion of the upper which is wiped down upon the margin of the sole by the wipers 42. The plates 66 are mounted to turn about pins 68 which are carried by the wipers 42, these pins being offset laterally toward opposite sides of the mechanism with reference to the central pin 64. Mounted between the wipers 42 and the plates 66 are binder applying members comprising driver plates 70, these plates having a thickness substantially equal to the thickness of a wire binder which is shown in position at $a$ in Fig. 5. One of the plates 70, in the construction shown, is mounted to turn on the pin 64, while the other plate is mounted on a pin 72 carried by one of the wipers 42, this construction avoiding the practical difficulty of mounting the two thin plates on the same axis while maintaining them in the same plane. Positioned on the pins 68 between the wipers 42 and the shoe embracing members 66 are washers 74 which are of substantially the same thickness as the driver plates 70 and assist in holding the wipers 42 and the members 66 apart a sufficient distance to afford openings for the driver plates to permit the plates to swing freely and in close relation to the wipers and the members 66. Screws 76 carried by the wiper members 42 are arranged to engage in slots 78 in the members 66 to limit the relative closing or opening movements of these members thereby rendering the members 66 effective, through engagement with the sides of the toe, to determine how far the wipers can close inwardly over the feather of the sole. These screws also extend through slots 80 in the driver plates 70 to assist in positioning these plates, and the members 66 and the plates 70 are normally positioned as shown in Fig. 5 by means of springs 82 which are mounted in sockets in the members 66 and engage downwardly turned lugs 84 on the driver plates, the tendency of these springs being to swing the members 66 inward and the plates 70 outward as far as permitted by the stop screws 76 on the wipers 42. The stop screws 76, moreover, are provided with heads 86 which are arranged to overlap a portion of the shoe embracing members 66 and thereby tend to prevent relative separating movement of these members and the wipers in directions transverse to the plane of the shoe bottom.

It will be evident from an inspection of Fig. 5, that, as the parts are normally positioned, a space is provided between the wipers 42 and the shoe embracing members 66 inside of the edges of the driver plates 70 sufficient for the reception of the inturned end portions of the wire binder a, with the pointed ends of the binder retracted outwardly from the inner edges of the members 66 in position to avoid engagement with the shoe materials during the operation of the wipers. At the intermediate portion, however, of the mechanism, the driver plates 70 are nearly flush with the inner edges of the wiper plates 42 and in front of the inner edges of the shoe embracing members 66. In order to assist in supporting the intermediate portion of the binder the machine is provided with a member 88, the end portion of which presents an upper binder supporting surface arranged to lie substantially in the plane of the surface of that portion of the upper which is wiped inward over the margin of the sole. The member 88 is mounted to slide in a guideway in the block 26 and is held normally in an advanced position, as shown in Figs. 2 and 5, by means of a spring 90, the forward limit of movement of the member being determined by a nut 92 which is secured to a rearward threaded extension of the member and is arranged to abut against a portion of the block 26. When the wipers are advanced toward the shoe the member 88 is forced backward against the tension of the spring 90 by engagement with the shoe in such manner as to permit the wipers and the binder applying means to advance over the margin of the sole at the toe end of the shoe.

The operation of the lasting mechanism is effected by a rearward swinging movement of the arm 18. To this end, the arm 18 is connected to a slide 94 mounted in a holder 96 which is supported on a shaft 98. A pinion 100 on the shaft 98 engages a rack 102 on the rear end of the slide 94, and turning movement of the shaft 98 to operate the slide is effected by means of a lever 104 which is provided with a gear segment 106 in engagement with a pinion 108 on the end of the shaft and also carries a roll 110 mounted in a cam groove 112 which is formed in a cam member on the cam shaft 6. Movement of the slide 94 lengthwise in the holder 96 is thus effected by the operation of the cam. By reference to Patent No. 1,029,387 it will be evident that the slide 94 and its operating means are substantially identical in construction and operation with mechanism heretofore provided in pulling-over machines for operating the tacking instrumentalities, and in the machine herein shown one function of the slide in its rearward movement is to cause the side tacker arms 14 to move inward over the shoe and to trip the tack driving members for driving the usual tacks for holding the upper in place at the sides of the shoe bottom. By this rearward movement of the slide 94 the front arm 18 also is swung rearwardly through the connection between the arm and slide comprising slots 114 extending lengthwise of the arm on its opposite sides and engaged by portions of the slide not shown in detail, this construction permitting relative movement of the slide and the arm lengthwise of the arm during the rearward movement of the slide. In this manner the wipers and the binder applying means are carried rearwardly toward the shoe.

As hereinbefore explained, operative closing movement of the wipers is effected by swinging movement of the gear segments 30. The means whereby such movement of the gear segments is effected comprises, in addition to the pinions 32 and the racks 36, rack controlling members 116 which are pivoted at 118 on a frame member 120, on the machine head. The members 116 at their lower ends are forked to receive the rounded extensions 40 of the racks 36. Mounted on these extensions 40 are springs 122 which bear at their outer ends on adjustable nuts 124 and at their inner ends on bearing members 126 in engagement with the members 116. The members 116 carry stop screws 130 which are arranged to engage abutment lugs 132 on a casting 134 which is secured to the member 120, engagement of these stop screws with the lugs serving to stop the inward swinging movement of the members 116 while the inward movement of the arm 18 continues. The tension of the springs 122 is such that when movement of the members 116 is stopped in this manner, movement of the rack bars 36 in unison with the block 26 is also stopped, and the continued movement of the block 26 with the arm 18 causes these rack bars to operate the gear segments 30 through the pinions 32 in such manner as to cause the wipers to close inwardly toward the shoe and over the margin of the shoe bottom. The stop screws 130 are adjustable in the members 116 for variably timing the beginning of the closing movements of the wipers and preferably the screws are so adjusted as to cause the wipers to close uniformly over the margin of the shoe at both sides as the intermediate portions of the wipers advance over the margin at the end. The construction, moreover, affords provision for variably timing the closing movement of either wiper independently of the other to adapt the mechanism to the contours of different shapes of shoes. As the arm 18 thus continues its inward movement after the movement of the members 116 has ceased, the wiper carrier is moved away from the members 116 against the tension of springs 136 which are connected at one end to the block 26 and at the other end to hooks on the sides of the members 116. After the wipers 42 have closed over the margin of the shoe at the sides and have forced the materials firmly into the angle between the feather and the rib of the sole, pressing the members 66 against the shoe, the abonrmal resistance to further closing movement of the wipers, in case the movement of the arm 18 continues, will cause the rack bars 36 to be carried along with the wiper carrier, compressing the springs 122 against the members 116. The provision for independent yield in the closing connections for each wiper plate also permits the swinging movement of each plate to be retarded or stopped, or even reversed slightly, independently of the movement of the other wiper plate, thus permitting the wipers to conform closely to the contour of the shoe and to wipe the upper effectively into lasted position all around the end of the shoe. When the parts are returned to their starting positions, the springs 136 will hold the members 116 with the stops 130 in engagement with the lugs 132 until the wiper head has been retracted to meet these members, this retracting movement of the wiper head causing the wipers to be swung to open position by the action of the rack bars 36 on the pinions 32. When the parts are in starting position washers 138 positioned between the members 116 and the wiper carrier and bearing upon shoulders on the rack bars 36, as shown in Fig. 5, serve to limit outward movement of the rack bars under the influence of the springs 122, while inward movement of these bars in their guideways 38 is limited by pins 140.

In order to afford provision for adjustment of the wipers to cause them to operate in planes in different angular relations to the plane of the shoe bottom and also to provide for a yield of the wipers upwardly from the plane of the shoe bottom in the case of abnormal resistance, the wiper carrier is mounted for swinging movement on the arm 18 through the provision of the pivot 20 which carries the plate 22. A lug 142 on the plate 22 carries a bolt 144 which extends through an opening in a lug 146 on the arm 18 and carries a spring 148 which bears at one end on the lug 146 and at its other end on a nut 150 on the bolt, the spring thus having a tendency to swing the wiper carrier in such a direction as to depress the ends of the wipers relatively to the shoe. The lug 142 carries also another bolt 152 extending through an opening in the lug 146 and having a nut 154 thereon which engages the lug 146 to limit the swinging movement of the wiper carrier effected by the action of the spring 148. The nut 154 may be adjusted on the bolt 152 to vary the limit of movement of the wiper carrier under the influence of the spring 148 and consequently to vary the normal angular relation of the wipers to the plane of the shoe bottom. Preferably the wipers are so adjusted as to be slightly inclined toward the plane of the shoe bottom from the toe end rearwardly when they are over the margin of the sole, thus insuring ample clearance between the wipers and the end of the sole to prevent damaging the sole. The wipers in closing over the shoe may also yield upwardly from the plane of the shoe bottom against the tension of the spring 148 to compensate for differences in the thickness of the upper materials, and the extent of such yielding movement may be limited by nuts 156 on the bolt 152. Alternately, of course, the nuts may be adjusted to hold the wipers against such upward yield.

As the wipers are moved inward toward the shoe by the rearwardly swinging movement of the arm 18, it is desirable that the toe gripper shall release its hold upon the upper as late as practicable in the inward movement of the wipers in order to avoid loss of the pulling-over tension. In pulling-over machines of the illustrative type as heretofore constructed, the grippers are provided with tripping devices which are engaged by the inwardly advancing tacker arms to cause the grippers to release the upper. In order to provide room for the wipers in the pesent machine, the arm 18 occupies normally a position farther to the front of the toe gripper than the corresponding tacker arm of prior machines. In order to cause the toe gripper to release the stock at the proper time in the construction shown, the gripper is provided with tripping mechanism more particularly described hereinafter, including a pivoted trip member 158 which is connected by a rod 160 to a lever 162 on the gripper, the forward end of this lever being positioned for engagement with an operating member 164 which is secured to the side of the arm 18. It will be understood that the limit of upward pulling movement of the toe gripper will vary, such variation depending upon the manner in which the gripper primarily engages the stock and also upon the degree of resistance of the stock in the pulling movement. In order to avoid interference of the wipers with the gripper jaws in case the jaws occupy an unusually low position after the pulling-over operation is effected, the member 164 is so shaped and arranged relatively to the lever 162 as to cause the gripper in such case to release the stock earlier than when it occupies a higher position. Such provision for timing the release of the gripper is afforded by the angular relation of the lever engaging face 165 of the member 164 to the path of upward movement of the toe gripper. The member 164 is so mounted on the arm 18, by reason of the slot and screw connection shown, as to permit adjustment of the member to vary the time of the gripper release relatively to the movement of the wipers.

In order to avoid breakage in case of accidental engagement of the wipers with the toe gripper 4, the toe gripper is mounted with provision for yielding movement backwardly. For this purpose springs 166 are connected at one end to the gripper and at the opposite end to bars 168 which are pivoted on the member 134. Forward movement of the toe gripper under the influence of the springs 166 is limited by the engagement of cam lugs 170 on the gripper casing with rolls 172 which are mounted on brackets 174 secured to the frame of the machine. The cam lugs 170 are so shaped and arranged relatively to the rolls as to permit the usual forward movement of the toe gripper during the updraw movement, the springs 166 holding the lugs in engagement with the rolls continuously during the upper pulling operation and thus serving to operate the gripper yieldingly to draft the upper forwardly on the last. In case the wipers should accidently engage the gripper jaws the springs 166 will yield, and thus insure against breakage of the parts.

Between the two bars 168 is a cross bar 176, and carried by this cross bar is a stop screw 178 which is arranged to engage the front side of the arm 18 and is held in engagement therewith by the springs 166. As the arm 18 swings rearwardly to operate the wipers the tension of the springs 166 is thus relaxed, and in consequence of this action the toe gripper, under the influence of its updraw spring, is permitted to yield backwardly in a direction to carry the margin of the upper toward lasting position. The backward movement of the gripper moreover permits it to be pulled farther upward from the shoe bottom and thus affords additional insurance against engagement of the wipers with the gripper. The normal tension of the springs 166 may be varied by adjusting the stop screw 178.

As hereinbefore explained, the driver plates 70 are operated to force the inturned ends of the wire binder $a$ into the shoe materials when the wipers 42 have arrived substantially at their limit of inward movement to crowd the stock into the angle between the feather and the rib of the sole. In order to operate the driver plates the machine is provided with drivers 180 which are arranged to engage the outer edges of the plates and are secured to the hubs of beveled pinions 182 which are mounted loosely on the studs 34 upon which the pinions 32 are also mounted. The pinions 182 are in engagement with beveled pinions 184 which are carried by short shafts 186 mounted in bearings in brackets 188 secured to the wiper carrier. Secured to the shafts 186 are arms 190 which are arranged to be operated from the slide member 94 previously described as the means for imparting operative movement to the arm 18. The movement of the member 94 for operating the arms 190, however, in a downwardly swinging movement, this movement corresponding substantially to that movement of the tacker actuating member in prior pulling-over machines of the illustrative type whereby the member effects a re-engagement with the tack drivers to lift the drivers after their driving movement. In order to operate the member 94 in this manner the carrier 96 in which the member is mounted is swung downwardly about the shaft 98 by the action of the cam 112 on a roll 192 which is carried by an arm 194 projecting from the carrier 96, the slots 114 in the arm 18 permitting this downward movement of the member 94 relatively to the arm.

The connections between the operating member 94 and one of the two arms 190 are shown in detail in Fig. 7. These connections comprise a rod 196 pivoted to the member 94 and supported in a sleeve member 198 which is mounted in an opening in a block 200 pivotally suspended at 202 in a forked recess in the arm 190. Secured to the end portion of the rod 196 by means of a set screw 204 is a block 206 through which the rod extends, this block having a downwardly projecting lug 208 through which extends a relatively short rod 210, this rod having an enlarged portion mounted for sliding movement in a socket in the supporting block 200. A nut 212 threaded on the rod 210 determines the normal position of this rod relatively to the block 206, and a spring 214 encircling the rod between its enlarged portion and the lug 208 tends to move the rod in a direction to hold the nut 212 against the lug. Mounted in a slot in the holder block 200 is a clutch roll 216 which, in the normal relation of the parts shown in Fig. 7, is arranged to engage in a recess 218 in the sleeve member 198 to lock this member against lengthwise movement relatively to the block 200. The roll 216 is supported in this position by engagement with the enlarged portion of the rod 210. On the side toward the roll this enlarged portion of the rod is cut away for a considerable distance from its outer end, as shown at 220, and at a certain stage in the operation of the mechanism the roll 216 is permitted to drop into this cut-away portion of the rod and thereby to release the sleeve 198, as will be explained.

Mounted upon the rod 196 is a spring 222 which bears at one end upon the sleeve 198 and at its other end upon a nut 224 on the rod, this spring tending to move the rod and sleeve in opposite directions and thus to hold the block 206 against the opposite end of the sleeve. Starting with the parts in their normal position shown in Figs. 2 and 7, downward swinging movement of the member 94 operates the rod 196 and the sleeve 198 and through the clutch roll 216 operates upon the block 200 to impart swinging movement to the lever arm 190, thus turning the connected rock shaft 186 and through the pinion 184, 182 imparting movement to the connected driver 180 to force the driver plate 70 inward and drive the end of the binder into the shoe materials in a direction substantially parallel to the plane of the sole. Under a predetermined resistance to the inward movement of the driver plate the spring 222 will yield, permitting the rod 196 to slide in the sleeve 198, and through the block 206 imparting movement in the same direction to the rod 210 until the clutch roll 216 is permitted to drop into the recess 220. This movement of the clutch roll serves to release the sleeve 198 and thereby to break the operative connection between the rod 196 and the arm 190. A spring 226 connected to the arm 190 will then immediately swing it backward, thereby returning the driver 180 to its starting position determined by engagement of the driver with a portion of the bracket 188. When the member 94 is again swung upwardly to return the parts to starting position, the rod 196 and the parts connected therewith are moved backwardly, or toward the right in Fig. 7, until the roll 216 is engaged by that portion of the rod 210 which is at the inner end of the recess 220. Since the recess 218 in the sleeve 198 is positioned at this time at some distance to the left of the roll, the rod 210 is locked by the roll temporarily against further movement. During the continued movement of the rod 196 and the block 206 the lug 208 will slide on the rod 210 against the tension of the spring 214 until the recess 218 arrives in position to receive the roll 216. At this point the roll will enter this recess and the rod 210 will be released, the parts finally assuming their starting positions shown in Fig. 7. It will be evident that in the operation of this construction substantially the same driving pressure is applied to the driver plate 70 irrespective of the width of the shoe, this pressure being determined by the resistance of the spring 222 to relative movement of the rod 196 and the sleeve 198, and by reason of this provision for independent release of each driver, the mechanism is self-adaptable to shoes of different widths. The pressure applied to either driver plate may be varied by adjusting the nut 224 to vary the tension of the spring 222 and thus to increase or diminish the pressure necessary to effect the release of the clutch connecting the arm 190 to its operating means. It will be evident that by suitable adjustment of these springs the binder applying pressures at the opposite sides of the toe are substantially equalized.

As hereinbefore explained, the wipers and the shoe are so positioned relatively as to insure ample clearance between the wipers and the sole when the wipers close over the shoe, the wipers being preferably inclined toward the sole from front to rear when they are positioned over the margin of the sole. In order to insure that the upper materials shall be pressed firmly into the angle between the feather and the rib of the sole and pressed firmly down upon the margin of the sole, the machine is provided with means for imparting a downward movement to the wipers after they have closed over the margin of the shoe bottom. To this end, the arm 18 is mounted upon an eccentric portion 228 of a rock shaft 230 which is supported in bearings in the frame. On the end of the shaft 230 is secured a lever 232 connected by a rod 234 to the member 94 at the same point where this member is connected to the rods 196. When the member 94 is swung downwardly to operate the driver plates 70, the rod 234 is pulled downwardly and operates the lever 232 to turn the rock shaft 230 in a direction to cause the eccentric 228 to force the arm 18 in a lengthwise downward direction. Downward pressure is thus brought to bear upon the upper materials on the feather of the sole, this increased pressure beginning just before the ends of the wire binder are forced into the upper materials and continuing during the binder applying operation. The upper is thus pressed down firmly upon the feather of the sole, and with the wipers inclined relatively to the plane of the sole as hereinbefore explained, relatively great pressure is applied by the end portions of the wipers adjacent to which the ends of the binder are located, thus insuring that the ends of the binder shall be forced into the shoe materials close to the feather of the sole.

The lever 232 is connected to the shaft 230 by a pin 236 which may be positioned in different holes 238 in the shaft to determine different starting positions for the eccentric 228. The connection between the lever 232 and rod 234 comprises a trunnion block 240 carried by the lever and slidable on the rod, and between this block and a nut 242 on the end of the rod is a spring 244 which tends to move the rod and the block in opposite directions, holding the block normally in engagement with a stop 246 on the rod. In case abnormal resistance to the downward movement of the wipers is encountered, as when the plane of the shoe bottom is higher than usual in the machine or the upper materials are heavier than usual, the spring 244 yields, permitting the rod 234 to be pulled downward without continuing the downward movement of the arm 18. In such case the final pressure of the wipers on the material on the margin of the sole is a yielding one under the tension of the spring 244, such pressure being varied by adjustment of the nut 242 as well as by adjustment of the pin 236 in the holes 238.

It will be evident, furthermore, that by reason of the angular relation of the slots 114 in the arm 18 to the member 94, one effect of the downwardly swinging movement of the member is to pull the arm 18 slightly backward beyond the limit to which it was moved by the previous rearwardly sliding movement of the member. A further pressure of the wipers against the stock toward the rib of the sole will thus be effected substantially simultaneously with their downward pressure toward the feather of the sole and the driving of the ends of the binder. An important effect of such rearward movement of the wipers is to tighten the binder about the shoe materials, and since the portions of the binder at the sides of the shoe are thus pushed farther backward as the ends are being forced into the shoe materials, the tendency is to bend the ends forwardly toward the toe end of the shoe, thereby anchoring the binder securely to the shoe as shown in Fig. 14, while leaving the ends in such condition that the binder may be easily removed when desired.

In order to clamp the shoe and to support it against the downward pressure of the wipers and the side tacking instrumentalities the side clamp arms 16 carry shoe engaging and supporting devices which are broadly similar in their construction and mode of operation to devices shown in prior United States Letters Patent No. 1,135,954, McFeely, and described more in detail in Patent No. 1,189,979, McFeely. These devices comprise members 248 for engaging the upper at the sides of the shoe, these members being mounted upon slides 250 on the arm 16 which are connected to operate slides 252 to move supporting members upwardly into engagement with the shoe. In the construction herein shown a pair of shoe supporting members 254 are carried by each member 252 and are arranged to engage the shoe in two locations, one near the toe end and the other farther back upon the upper, the two members for engaging the shoe near the toe being movable into positions substantially contiguous to each other. The shoe supporting members 254 are mounted for substantially universal movement on holders 256 which are pivoted at 258 on arms 260 for limited rocking movement lengthwise of the shoe, these arms being secured to supports 262 which are adjustable on the slides 252 in substantially the same manner as shown in Patent No. 1,189,979. The front supporting members 254 engaging the shoe near the end of the toe serve effectually to sustain the shoe against the downward pressure of the wipers.

In order to insure that the initial lengthwise position of the shoe shall be in the correct relation to the lasting means and also to insure that the margin of the sole shall be correctly positioned when the wipers close inwardly over it, the machine is further provided with means for determining the location of the toe end of the last when the work is presented to the machine and also with means for holding down the margin of the sole at the toe end during the upper pulling operation and until the wipers have advanced substantially to the edge of the shoe. These means comprise a last positioning member 264 which is curved to embrace the lateral surface of the last around the toe and is mounted on a pivot 266 on the sole rest 10, and a holddown member 268 also mounted on the pivot 266 and positioned at the inner side of the member 264, this holddown member being shaped to engage the margin of the sole outside of the upper attaching rib or shoulder close to the outer edge of the last. Initially these members are positioned as shown in Figs. 2 and 9 with the member 264 projecting lower than the holddown 268 in position to embrace the end of the last when the work is presented to the machine. The operating means for retracting the members 264 and 268 in order to permit the wipers to advance over the shoe comprises a rod 270 which is carried by a block 272 mounted on a pivot 274 on the frame, this block having secured to its opposite sides cam plates 276 which project forwardly close to the opposite side portions of the forked frame member 120 and at opposite sides of the path of movement of the arm 18. These plates are provided with cam slots 278 which are engaged by rolls 280 carried by the arm 18 at its opposite sides. The rod 270 is mounted for lengthwise movement in the block 272 and is encircled by a spring 282 which tends to move the rod upwardly. At its lower end the rod 270 carries a pin 284 which extends at opposite sides of the rod and engages in cam slots 286 formed in upward projections 287 of the sole rest 10 at opposite sides of the rod. The last positioning member 264 has in its opposite side portions curved slots 288 the front portions of which extend upwardly at an angle to the plane of the shoe bottom, and the hold-down member has in its opposite side portions straight slots 290 which are substantially parallel to the plane of the shoe bottom when the member is in operative position, through all of which slots the pin 284 extends. The action of the spring 282 upon the rod 270 is to hold the pin 284 against the upper sides of the slots 286 in the sole rest member while permitting the rod to be moved downwardly when the sole rest is depressed, and the pin 284 is operated to swing the members 264 and 268 upwardly by the movement of the rod 270 rearwardly and then upwardly to the upper end of the slots 286, the right hand portion of these slots extending upwardly relatively to the left hand portion and the left hand portion being substantially parallel to the plane of the sole, as shown in the drawings. The operative movement of the lower end portion of the rod 270 rearwardly is effected by a downward swinging movement of the cam plates 276, this movement being accelerated when the rolls 280 arrive at the angled portion 292 of the cam slots 278, the rolls arriving at this point when the wipers have been advanced nearly to the edge of the shoe. The first operation of the pin 284 is to swing the last positioning member 264 from the position which it occupies in Fig. 9 to that indicated in Fig. 10 by the engagement of the pin in the upwardly angled portion of the cam slots 288. During this movement the position of the member 268 is not affected. As soon as the pin arrives at the beginning of the upwardly extending portion of the slots 286 in the guide member 287, at which time the movement of the rod 270 is accelerated by the engagement of the rolls 280 with the projections 292, the spring 282 is permitted to act to impart a quick upward movement to the rod 270 during its continued rearward movement. During this movement of the rod the pin 284 operates both the members 264 and 268, swinging them quickly from the position indicated in Fig. 10 to that indicated in Fig. 11, and leaving the wipers free to close over the shoe without obstruction.

It will be evident that the member 264 serves not only to position the shoe but also to guard the edge of the sole at the toe from any engagement with the upper in the pulling-over operation such as might have a tendency to lift the margin of the sole from the last. As the member is swung from its position in Fig. 9 to its position in Fig. 10 it wipes over the inner surface of the upper which is held under tension by the grippers and tends to smooth out any wrinkles that there may be in the tensioned upper, thus assisting in the preparation of the upper for the operation of the lasting means.

The construction of the toe gripper and its tripping or releasing mechanism is shown in detail in Fig. 4ª. The gripper comprises a bar 294 connected at its upper end to the usual updraw lever, this bar at its lower end being slidingly movable in a gripper casing 296 which has lugs 298 for engagement with a portion of the frame of the machine to limit downward movement of the casing and permit the bar to slide downwardly in the casing against the resistance of a spring 300 which is positioned in a recess in the bar and acts oppositely against the bar and a block 302 secured within the casing. The bar 294 has a lengthwise slot to receive the block 302 and to permit the bar to extend downwardly at opposite sides of the block. The gripper is provided with two pairs of jaws mounted on holders 304 which have sleeve portions 306 extending into sockets in the casing 296 and secured by set screws 308. Each pair of jaws may be adjusted independently to conform to the shape of a shoe by loosening its set screw and turning the holder as required, the screw being tightened to hold the jaws in adjusted position. The inner jaw of each pair is fixed to its holder 304 and the outer jaw is pivoted on the holder and provided with a curved tail portion to be operated upon by a roll 310. The rolls 310 are mounted on stems 312 which are slidable in the respective sleeves 306 and have peripheral grooves to receive the ends of a rocker bar 314 which is pivoted on a block 316 loosely positioned within the casing 296. The block 316 has an opening to receive the lower end of a latch 318 which is pivotally mounted on the lower end of the bar 294 and is swung forwardly by a spring 320. The latch 318 thus serves to connect the gripper bar to the block 316, whereby the block is raised by the bar when the bar is moved upwardly and through the rocker bar 314 and the other connections described imparts closing movement to the pivoted jaws, the pressure of the jaws on the stock being substantially equalized by the action of the rocker bar. In this closing movement of the jaws the spring 300 acts to hold the casing 296 in its lowermost position, and when the jaws have firmly gripped the upper the casing and the jaws are moved upwardly by the bar 294 to pull the upper.
For tripping the gripper to cause it to release the upper, the trip member 158 hereinbefore described is pivotally mounted on the block 316 and extends outwardly through an opening in the front side of the block, this member being arranged to engage the lower hooked end of the latch 318 and to force the latch backwardly out of engagement with the block 316, thus breaking the connection between the gripper bar and the pivoted jaws to permit them to open and release the upper. Such tripping movement is imparted to the member 158 at a predetermined time in the operation of the lasting means by the action of the parts 160, 162 and 164 as hereinbefore described. It will be understood that in the return of the parts to starting position the gripper bar 294 continues its downward movement after movement of the casing 296 is stopped by engagement of the lugs 298 with the frame, and that in this manner the latch 318 is moved into position to connect the bar again to the block 316.

Novel features of the toe gripper herein described are claimed in a divisional application, Serial No. 577,377 filed on July 25, 1922.

In the operation of the machine, the shoe is placed substantially in the position indicated in Fig. 2 with the toe end of the last and the margin or feather of the sole in engagement respectively with the last positioning member 264 and the holddown member 268 and with the margin of the upper inserted between the jaws of the side grippers 2 and the toe gripper 4. The machine is then started, causing the grippers to close upon the upper and to pull upwardly, and the sole rest 10 to be depressed by the cam 12, to tension the upper over the last, the toe gripper 4 having also a forward pulling movement during its updraw movement, this movement being effected by the springs 166 and controlled by the rolls 172 in engagement with the cam lugs 170. When the machine is started, also, the heel rest 8 is moved forward into engagement with the heel end of the last, thus positioning the last between the heel rest at the rear and the member 264 at the front. At the end of the updraw movement of the grippers the machine stops to permit the operator to inspect the work and to make whatever adjustments may be necessary in order to
straighten the tip line of the shoe and cor-
rect any other inaccuracy in the position of the upper with reference to the last, as well as to increase or diminish the tension on the upper at one point or another as conditions may require. During the upper pulling operation the last positioning and hold-down members 264 and 268 move with the sole rest, the latter pulling the rod 270 downwardly against the resistance of the spring 282, and remain in the same positions relatively to the shoe in which they are shown in Fig. 9.

After the upper has been correctly positioned on the last, the machine is started a second time, causing the side clamp arms 16 to move the shoe holding and supporting members to operative position, as shown in Fig. 4, and causing the side grippers and the side tacker arms to move inward over the shoe in the usual manner. Simultaneously the member 94 operates to swing the arm 18 rearwardly, thereby advancing the wipers toward their operative position. During this advancing movement of the wipers the last positioning member 264 is first swung upwardly to the position shown in Fig. 10 by the operation of the rod 270, and then both this member and the hold-down member 268 are moved to the respective positions indicated in Fig. 11. As the arm 18 swings rearwardly, the tension of the springs 166 is relaxed, as hereinbefore explained, thereby permitting the toe gripper, under the influence of its updraw spring, to swing rearwardly from its forwardly advanced position and to move farther upwardly in unison with the advancing movement of the wipers. At a predetermined point or points in the inward movement of the wipers, which may be variably determined for each wiper independently as hereinbefore explained, the stop screws 130 engage the lugs 132, thus stopping the movement of the members 116, and during the continued rearward movement of the wiper head the wipers 42 are closed inward about their pivotal connection 64 by the rack and pinion connections in the manner hereinbefore described. When the wipers have arrived in a position to assume control of the tensioned upper, the toe gripper is caused to release the upper by the engagement of the member 164 with the lever 162. During the rearward movement of the wiper carrier and the closing of the wipers the shoe embracing members 66 are carried firmly into engagement with the lateral surface of the upper around the toe close to the margin of the shoe bottom, these members being pressed inwardly against the sides of the toe by the springs 82 in substantial conformity to the contour of the shoe. In this operation of the wipers the wire binder $a$, which preliminarily to the operation of the machine is placed in the position indicated in Fig. 5 between the members 42 and 66 and upon the supporting member 88, is crowded by the action of the front end portions of the plates 70 closely into the angle formed in the upper materials between the feather and the rib of the sole at the toe end of the shoe. When the arm 18 has arrived substantially at its limit of rearward movement, the springs 122 and 148 having yielded if conditions are such as to cause such a yield to permit the wipers to conform properly to the shape of the shoe, and after the upper has been wiped over the margin of the sole and against the rib at the toe end and along the sides of the forepart as shown in Fig. 12, the member 94 is swung downwardly to operate the driver plates 70 under the predetermined tension of the springs 222 as hereinbefore explained, thereby crowding the wire binder closely into the angle of the upper materials at the sides of the forepart of the shoe and forcing the ends of the binder into the upper, and it may be also into the rib or shoulder of the sole, as shown in Fig. 13, these plates having also a supplemental overwiping effect on the upper during the movement of the member 94 to operate the driver plates 70, downward pressure is applied by the wipers in a direction toward the margin of the sole through the operation of the eccentric member 228 on the arm 18, and by this action of the member 94 a slight additional rearward movement is also imparted to the arm 18 to carry the wipers farther rearwardly in the manner hereinbefore explained, thereby pressing the upper firmly upon the feather of the sole, particularly adjacent to the ends of the wipers, and also wiping it firmly against the rib of the sole, and at the same time tightening the binder rearwardly and causing its ends to be bent forwardly as they are forced into the shoe. Before this operation is completed the side tacks also are driven to hold the upper in place at the sides of the shoe. After the upper has been secured in lasted position about the toe by means of the wire binder and at the sides by the tacks, the parts of the machine return to their starting positions and the shoe is released.

The forepart of a shoe which has been operated upon by the machine is shown in Fig. 14. In this view the ends of the binder are shown as extended through the upper materials and also through the rib of the sole, but the extent to which the ends of the binder may project into or through the materials may be varied as desired. The ends of the binder in their final position project somewhat toward the toe end of the shoe, as shown, this result being secured in the manner hereinbefore explained and it may be also in part by bending the ends of the binder preliminarily to form angles less than right angles with the adjacent portions, as explained in my prior Patent No. 1,406,280. The forward pull on the binder by the upper materials will thus tend to hold the ends firmly in the shoe; and the retention of the binder in place is further insured by the action of the side tacks which are driven adjacent to the ends of the binder and hold the upper at those points against lateral outward strain such as might tend to pull the ends of the binder outward. In Fig. 14 the tacks are shown as driven slightly to the rear of the ends of the binder. If desired, however, the tacks may be driven in other relations to the binder by the side tacking mechanisms. In Fig. 15, for example, a tack $b$ is shown driven through the upper materials into the rib of the sole inside of the binder and near the inturned end, another tack $c$ being driven into the feather of the sole at the rear of the binder. In Fig. 16 a tack $d$ is shown driven into the feather of the sole outside of the binder and in front of the inturned end portion, thus insuring positively against premature withdrawal of the inturned end, other tacks $e$ also being shown at the rear of the binder. It is to be understood that these different arrangement of tacks are merely illustrative and it is not contemplated that under the usual conditions in the use of the construction shown any tack or like fastening will be needed to insure that the binder will be retained securely in place.

Having described the invention, what I claim as new and desire to secure by Letters Patent of the United States is:

1. A machine for working an upper over a last having, in combination, pulling-over means, end lasting means, and power driven mechanism for operating said pulling-over means and lasting means to cause the pulling-over means to perform its operation on the upper and to release the upper to the control of the lasting means at such time in the operation of the lasting means as to prevent substantial loss of the pulling-over tension, said operating mechanism being constructed and arranged to cause the lasting means to wipe the upper over the margin of the sole and then automatically to apply increased pressure against the upper upon said margin.

2. A machine for working an upper over a last having, in combination, pulling-over means, shoe supporting means, end lasting means, and power driven mechanism for operating said pulling-over means and lasting means constructed and arranged to cause the pulling-over means to perform its operation on the upper and to release the upper to the control of the lasting means and to cause the lasting means to assume control of the upper at such time in the operation of said pulling-over and lasting means as to prevent substantial loss of the pulling-over tension, said operating mechanism being constructed and arranged to move the lasting means lengthwise and laterally of the shoe to wipe the upper over the sole and to move the lasting means and the shoe supporting means relatively in a direction transverse to the plane of the sole to press the upper upon the margin of the sole.

3. A machine for working an upper over a last having, in combination, pulling-over means, end lasting means, power driven mechanism for operating the pulling-over means to cause said means to tension the upper and to come automatically to rest to permit relative adjustment of the upper and the last prior to the operation of the lasting means, and power mechanism for operating the lasting means to cause it to assume control of the tensioned upper when the machine is again started and to wipe the upper into lasted position and press it on the margin of the sole by movement first along the plane of the sole lengthwise of the shoe and then toward said plane.

4. A machine for working an upper over a last having, in combination, pulling-over means, end lasting means, and power driven mechanism for operating the pulling-over means to cause said means to tension the upper and for operating the lasting means to cause it to assume control of the tensioned upper and wipe the upper into lasted position and press it on the margin of the sole by movement along the plane of the sole lengthwise of the shoe and toward said plane.

5. A machine for working an upper over a last, having, in combination, pulling-over means, end lasting means, mechanism for operating the pulling-over means to cause said means to tension the upper and to come automatically to rest to permit relative adjustment of the upper and the last, and power driven mechanism for operating the lasting means to cause it to assume control of the tensioned upper without permitting the tension to be substantially relaxed and to wipe the upper lengthwise and laterally of the shoe into lasted position, said operating mechanism for the lasting means being constructed and arranged to cause said means to close over the margin of the sole above the plane of the sole and to move toward the plane of the sole to press the upper upon said margin.

6. A machine for working an upper over a last having, in combination, pulling-over means, end lasting means, mechanism for operating said pulling-over means and lasting means to cause the pulling-over means to perform its operation on the upper automatically and to release the upper to the control of the lasting means at such time in the operation of the lasting means as to prevent substantial loss of the pulling-over tension and also to cause the lasting means to close over the margin of the shoe bottom in wiping engagement with the upper, and means automatically operative in time relation to other parts to effect relative movement of the lasting means and the shoe while the lasting means is over the shoe bottom to cause said means to press the upper upon said margin.

7. A machine for working an upper over a last having, in combination, upper engaging grippers, means for effecting relative movement of the last and grippers to tension the upper and for causing the grippers then to hold the upper under tension to permit it to be adjusted on the last, end lasting means, and power driven mechanism for operating said lasting means to cause it to assume control of the tensioned upper and to wipe the upper into lasted position by a movement first along the plane of the shoe bottom and then toward said plane to press the upper upon the margin of the sole.

8. A machine for working an upper over a last having, in combination, pulling-over means, end lasting means, mechanism for operating said pulling-over means and lasting means to cause the pulling-over means to tension the upper and the lasting means to assume control of the tensioned upper by a wiping movement lengthwise of the shoe and over the margin of the sole, means for positioning the shoe in such relation to the lasting means as to insure clearance between the lasting means and the sole, and power means automatically operative to move the lasting means toward the plane of the sole to press the upper into lasted position.

9. A machine for working an upper over a last having, in combination, pulling-over means, end lasting means, mechanism for operating said pulling-over means and lasting means to pull the upper and to wipe it rearwardly and inwardly over the sole, means for positioning the shoe in such relation to the lasting means as to insure clearance between the lasting means and the sole, and means automatically operative in time relation to other parts to move the lasting means toward the plane of the sole to press the upper into lasted position.

10. A machine for working an upper over a last having, in combination, grippers and means for operating them to pull the upper over the last and then to hold the upper under tension while the machine is at rest, end lasting wipers, power driven means for operating said wipers when the machine is again started to cause them to assume control of the tensioned upper and to wipe the upper over the margin of the sole by movement lengthwise and laterally of the shoe, and means automatically operative to impart to the wipers a movement toward the plane of the sole to press the upper into lasted position.

11. A machine for working an upper over a last having, in combination, grippers and power means for operating them to pull the upper over the last and then to bring the machine to a stop with the upper held under tension, end lasting wipers, power driven means for operating said wipers when the machine is again started to cause them to assume control of the tensioned upper and to wipe the upper over the margin of the sole by movements lengthwise and laterally of the shoe, and means for effecting a relative movement between the wipers and the last in a direction transverse to the plane of the sole to press the upper upon the feather of the sole.

12. A machine for working an upper over a last having, in combination, pulling-over means, mechanism for operating said pulling-over means to tension the upper over the last, end lasting wipers, power driven means for operating said wipers to cause them to assume control of the tensioned upper and to wipe it over the feather and against the rib or shoulder of a sole on the last, and additional operating means for imparting to said wipers a final movement toward the feather and the rib or shoulder of the sole to press the upper into lasted position.

13. A machine for working an upper over a last having, in combination, means for pulling over the upper, end lasting means comprising an arm mounted to swing lengthwise of the shoe and wipers carried by said arm, means for imparting operative movement to said arm to cause the wipers to close over the margin of the sole, means for positioning the last in such relation to said wipers as to insure clearance between the sole and the wipers, and means for moving said arm in a direction to cause the wipers to press the upper upon the margin of the sole after they have closed over the edge of the sole.

14. A machine for working an upper over a last having, in combination, means for pulling over the upper, end lasting means comprising an arm mounted to swing lengthwise of the shoe and wipers carried by said arm, an eccentric upon which said arm is mounted, and means for operating said eccentric while the wipers are positioned over the shoe bottom to cause the wipers to press the upper upon the margin of the sole.

15. A machine for working an upper over a last having, in combination, end lasting wipers, a support for said wipers, said support being movable to carry the wipers over the shoe, an eccentric upon which said support is mounted, and means for operating said eccentric to cause the wipers to press the upper upon the margin of the sole.

16. A machine for working an upper over a last having, in combination, pulling-over means, end lasting means, mechanism for operating said pulling-over means and lasting means to cause the pulling-over means to tension the upper and the lasting means to assume control of the tensioned upper by a movement lengthwise of the shoe and over the margin of the sole, and yieldable means for imparting to said lasting means a movement toward the plane of the sole to press the upper upon the margin of the sole.

17. A machine for working an upper over a last having, in combination, means for pulling-over the upper, end lasting means comprising a wiper support movable lengthwise of the shoe and wipers carried by said support, means for operating said support to cause the wipers to assume control of the tensioned upper and to wipe it over the margin of the sole, and mechanism for moving said support in a direction to cause the wipers to press the upper upon the margin of the sole, said mechanism including a spring arranged to yield when the wipers encounter a predetermined resistance.

18. A machine for working an upper over a last having, in combination, means for pulling-over the upper, end lasting means comprising an arm mounted to swing lengthwise of the shoe and wipers carried by said arm, an eccentric upon which said arm is mounted, and mechanism for operating said eccentric while the wipers are positioned over the shoe bottom to cause the wipers to press the upper upon the margin of the sole, said mechanism including a spring arranged to yield when the wipers encounter a predetermined resistance.

19. A machine for working an upper over a last having, in combination, end lasting wipers, a support for said wipers, an eccentric on which said support is mounted for movement to carry the wipers over the shoe, and yieldable means for operating said eccentric to cause the wipers to press the upper upon the margin of the sole.

20. A machine for working an upper over a last having, in combination, pulling-over means, end lasting means, mechanism for operating said pulling-over means and lasting means to cause the pulling-over means to tension the upper and the lasting means to assume control of the tensioned upper and lay it over the margin of the sole, and means automatically operative in time relation to other parts of the machine for effecting relative movement of the lasting means and the last to cause the lasting means to press the upper upon the margin of the sole with a relatively greater pressure at the sides of the end portion of the shoe than at the extreme end of the shoe.

21. A machine for working an upper over a last having, in combination, pulling-over means, end lasting wipers, mechanism for operating the pulling-over means to cause said means to tension the upper and to come to rest to permit relative adjustment of the upper and the last, mechanism for operating said wipers to cause them to assume control of the tensioned upper and to wipe the upper into lasted position, said wipers being so mounted as to be inclined toward the plane of the sole from the toe end of the shoe toward the rear when they are over the shoe bottom to insure clearance between the wipers and the sole at the toe end of the shoe as the wipers close over the shoe, and means for effecting relative movement of the wipers and the last to cause the wipers to press the upper down upon the margin of the sole.

22. A machine for working an upper over a last having, in combination, shoe positioning means, end lasting wipers, mechanism for operating said wipers to cause them to wipe the upper over the margin of the sole, said wipers being so mounted as to be inclined toward the shoe bottom from the toe end of the shoe toward the rear when they are over said margin, and means for effecting relative movement of the wipers and the last to cause the wipers to press the upper upon the margin of the sole with a relatively greater pressure at the ends of the wipers.

23. A machine for working an upper over a last having, in combination, shoe positioning means, end lasting wipers, mechanism for operating said wipers to cause them to wipe the upper over the margin of the sole, said wipers being so mounted as to be inclined toward the shoe bottom from the toe end of the shoe toward the rear when they are over said margin, and means for moving the wipers bodily toward the plane of the sole to cause them to press the upper upon the margin of the sole, said wipers being pivotally supported for yielding movement about an axis extending laterally of the shoe.

24. A machine for working an upper over a last having, in combination, shoe positioning means, end lasting wipers, a support upon which said wipers are mounted, said support being movable lengthwise of the shoe about an axis substantially opposite to the bottom of the shoe, means for moving said support lengthwise of the shoe to cause the wipers to last the end portion of the shoe, the wipers being pivotally mounted on said support to permit them to swing about an axis extending laterally of the shoe in substantially parallel relation to the plane of the shoe bottom, and means tending to swing the wipers toward said plane while permitting them to yield in response to abnormal pressure.

25. A machine for working an upper over a last having, in combination, shoe positioning means, end lasting wipers, a support upon which said wipers are mounted, said support being movable lengthwise of the shoe about an axis substantially opposite to the bottom of the shoe, means for moving said support lengthwise of the shoe to cause the wipers to last the end portion of the shoe, the wipers being pivotally mounted on said support to permit them to swing about an axis extending laterally of the shoe in substantially parallel relation to the plane of the shoe bottom, means tending to swing the wipers toward said plane while permitting them to yield in response to abnormal pressure, and means for variably determining the normal position of the wipers with respect to movement about said axis.

26. A machine for working an upper over a last having, in combination, shoe positioning means, end lasting wipers, a support upon which said wipers are mounted, means for moving said support lengthwise of the shoe to cause the wipers to last the end portion of the shoe, and means for adjusting the wipers relatively to said support about an axis which is located beyond the end of the shoe when the wipers are in closed position to cause them to project normally in different angular relations to the plane of the shoe bottom.

27. In a machine of the class described, end lasting wipers, a support for said wipers mounted to swing in a fixed path about an axis substantially opposite to the bottom of the shoe to carry the wipers over the shoe, and means for positioning the wipers on said support in different angular relations to their path of movement.

28. In a machine of the class described, end lasting wipers, a support for said wipers mounted for swinging movement to carry the wipers over a shoe, the means for swinging said support wipers being adjustable on said support in different angular relations to their path of movement, and additional means for operating said support when the wipers are over the shoe to cause the wipers to press the upper upon the margin of the sole.

29. In a machine of the class described, a swinging wiper support 18, wipers 42 on said support adjustable relatively to the support about an axis 20, and means 154 for adjusting said wipers.

30. In a machine of the class described, a swinging wiper support 18, wipers 42 on said support adjustable about an axis 20, and an eccentric 228 for operating said support to cause the wipers to press the upper upon the shoe bottom.

31. A machine for working an upper over a last having, in combination, shoe positioning means, end lasting wipers mounted for closing movements laterally of the shoe, operating means for moving said wipers bodily toward the shoe, and means for automatically initiating the closing movements of said wipers each independently of the other at times in the movement of the wipers toward the shoe variably determined with respect to the different wipers independently.

32. A machine for working an upper over a last having, in combination, shoe positioning means, end lasting wipers mounted for closing movements independently of each other, a wiper support, mechanisms on said support connected respectively to the different wipers for closing them, means for moving the support toward the shoe, an operating member for each of said mechanisms, said members being mounted for movement initially with the support, and means for stopping the movement of said members each independently of the other at times variably determined with respect to the different members independently to initiate the closing movements of the respective wipers.

33. A machine for working an upper over a last having, in combination, shoe positioning means, end lasting wipers mounted for closing movements independently of each other, a wiper support, means for moving said support to carry the wipers bodily toward the shoe, and means for closing the wipers through the movement of the support, said closing means being constructed and arranged to initiate the closing movements of the respective wipers at times variably determined with respect to the different wipers independently to vary the extent of said closing movements.

34. A machine for working an upper over a last having, in combination, shoe positioning means, end lasting wipers, a support on which said wipers are mounted for closing and opening movements, mechanism on the support for closing the wipers comprising pinions for operating the wipers and racks engaging the pinions, means for moving the support together with the racks to carry the wipers bodily toward the shoe, and means for stopping the movement of the racks in predetermined time relation to the movement of the support toward the shoe subsequent to the beginning of said movement to cause said mechanism to close the wipers during the continued movement of the support.

35. A machine for working an upper over a last having, in combination, shoe positioning means, end lasting wipers, a support on which said wipers are mounted for closing and opening movements, mechanism on the support for closing the wipers comprising pinions for operating the wipers and racks engaging the pinions, means for moving the support to carry the wipers bodily toward the shoe, a controlling member for each rack, said members being movable initially with the wiper support, and means for engaging said members to stop the movements of the respective racks at times variably determined with respect to each rack independently to cause each of the wipers to close a predetermined distance during the continued movement of the support.

36. A machine for working an upper over a last having, in combination, shoe positioning means, end lasting wipers, a support on which said wipers are mounted for closing and opening movements, mechanism on said support for closing the wipers comprising pinions for operating the wipers and racks engaging the pinions, means for moving the support to carry the wipers bodily forward toward the shoe, and means for controlling each rack to stop the movements of the racks in predetermined time relation to the movement of the support toward the shoe subsequent to the beginning of said movement to cause said mechanism to close the wipers, said rack controlling means being yieldable to permit the closing movement of the wipers to cease in response to resistance during their continued forward movement.

37. A machine for working an upper over a last having, in combination, shoe positioning means, end lasting wipers, a support on which said wipers are mounted for closing and opening movements, operating mechanisms on said support for closing said wipers each independently of the other, means for moving the support to carry the wipers bodily toward the shoe, means for stopping the movement of a portion of each of said operating mechanisms in time relation to the movement of said support subsequent to the beginning of its movement to effect the closing movements of the wipers, said stopping means being adjustable with respect to each of said mechanisms independently of the other to vary the extent of the closing movements of the respective wipers.

38. A machine for working an upper over a last having, in combination, pulling-over means comprising a toe gripper, mechanism for operating said gripper to tension the upper, and power operated end lasting means movable toward the toe of the shoe to last the tensioned upper, said toe gripper being movable against yielding resistance in the direction of operative movement of the lasting means.

39. A machine for working an upper over a last having, in combination, pulling-over means comprising a toe gripper, mechanism for imparting an updraw movement to said gripper, end lasting means movable toward the toe of the shoe to last the tensioned upper, and a spring connected to said gripper to pull it forwardly during its updraw movement, said spring being arranged to permit the gripper to yield backwardly during the operative movement of the lasting means.

40. In a pulling-over machine, the combination with last positioning means, of a toe gripper, mechanism for imparting an updraw movement to said gripper, and a spring for forcing the gripper forwardly to cause it to effect a forward draft of the toe portion of the upper during its updraw movement.

41. In a pulling-over machine, the combination with last positioning means, of a toe gripper, mechanism for imparting an updraw movement to said gripper, a spring associated with said gripper to force it forwardly, and cam means for controlling the forward movement of the gripper effected by said spring during its updraw movement to cause the gripper to draft the toe portion of the upper forwardly.

42. In a pulling-over machine, the combination with last positioning means, of a toe gripper, mechanism for imparting an updraw movement to said gripper, a spring associated with said gripper to force it forwardly, a cam on the gripper, and an abutment engaging said cam, said cam and abutment being constructed and arranged to control the forward movement of the gripper during its updraw movement.

43. A machine for working an upper over a last having, in combination, pulling-over means comprising a toe gripper, means for imparting updraw movement to said gripper, means comprising a spring for forcing said gripper forwardly to draft the upper lengthwise of the last, end lasting means, mechanism for moving said lasting means toward the toe end of the shoe, and means for relaxing the tension of said spring in time relation to the movement of the lasting means to permit the toe gripper to swing rearwardly as said lasting means is moved toward the shoe.

44. A machine for working an upper over a last having, in combination, pulling-over means comprising a toe gripper, spring means for operating said gripper to pull the upper upwardly and forwardly, end lasting means, mechanism for moving said lasting means toward the toe end of the shoe, and means for relaxing the forward tension on said gripper while continuing the updraw tension to permit the gripper to carry the upper toward the toe end of the last and to withdraw farther from the path of movement of the lasting means.

45. A machine for working an upper over a last having, in combination, pulling-over means comprising a toe gripper, yieldable means for imparting an updraw movement to said gripper, a spring associated with the gripper to force it forwardly, end lasting means, mechanism for moving said lasting means toward the toe end of the shoe, and means constructed for operation during the operative movement of said lasting means for causing the tension of said spring to be relaxed to permit the gripper to swing rearwardly and to pull farther upward as the lasting means moves toward the shoe.

46. A machine for working an upper over a last having, in combination, pulling-over means comprising a toe gripper, yieldable means for imparting an updraw movement to said gripper, a spring associated with the gripper to force it forwardly to draft the upper lengthwise of the last, end lasting wipers, a wiper support, means for moving said support to carry the wipers toward the toe end of the shoe, and a connection between said support and spring to cause the tension of the spring to be relaxed as the wipers move toward the shoe.

47. A machine for working an upper over a last having, in combination, pulling-over means comprising a toe gripper, yieldable means for imparting an updraw movement to said gripper, end lasting means, mechanism for moving said lasting means toward the toe end of the shoe, a spring associated with said gripper to force it forwardly and associated also with the lasting means to cause the tension of the spring to be relaxed as the lasting means moves toward the shoe, and means for adjusting the tension of the spring.

48. A machine for working an upper over a last having, in combination, pulling-over means comprising a gripper, means for imparting an updraw movement to said gripper, lasting means movable toward the shoe to last the portion of the upper engaged by said gripper, and means for causing the gripper to release the upper in variably timed relation to the operative movement of the lasting means depending upon the extent of the updraw movement of the gripper relatively to the last.

49. A machine for working an upper over a last having, in combination, pulling-over means comprising a gripper, means for imparting updraw movements of varying extent to said gripper in operating on different shoes, lasting means movable toward the shoe to last the portion of the upper engaged by said gripper, releasing means on the gripper operable to cause the gripper to release the upper, and means movable with the lasting means for operating said releasing means in variably timed relation to the operative movement of the lasting means depending upon the extent of the updraw movement of the gripper.

50. A machine for working an upper over a last having, in combination, pulling-over means comprising a gripper, means for imparting updraw movement to said gripper to cause it to pull the upper and to come to rest in a position at a variable distance from the plane of the last bottom, lasting means movable toward the shoe to last the portion of the upper engaged by the gripper, and means for causing the gripper to release the upper at a time increasingly late in the operative movement of the lasting means in proportion to the distance of the gripper from the plane of the last bottom.

51. A machine for working an upper over a last having, in combination, pulling-over means comprising a gripper, means for imparting updraw movement to said gripper to cause it to pull the upper and to come to rest in a position at a variable distance from the plane of the last bottom, lasting means movable toward the shoe to last the portion of the upper engaged by said gripper, releasing means on the gripper operable to cause the gripper to release the upper, and means movable with the lasting means for operating said releasing means at a time in the movement of the lasting means depending upon the distance of the gripper from the plane of the last bottom.

52. A machine for working an upper over a last having, in combination, pulling-over means comprising a gripper, means for imparting updraw movement to said gripper, lasting means movable toward the shoe to last the portion of the upper engaged by the gripper, releasing means on the gripper comprising a member operable to cause the gripper to release the upper, and a member carried by the lasting means for operating said gripper releasing member, said operating member having an operating surface inclined to the direction of updraw movement of the gripper in a direction to cause the gripper to release the upper increasingly late in proportion to the distance of the gripper from the plane of the last bottom.

53. A machine of the class described having, in combination, a gripper and means for operating it to pull an upper over a last, a releasing device on said gripper to cause it to open and release the upper, overlaying means comprising a support and an overlaying member movable toward the shoe to lay the margin of the upper over the bottom of the last, and a device on said support presenting a surface inclined to the direction of the pull of the gripper for engaging and operating said releasing device at a time depending upon the extent of the pull of the gripper.

54. A machine of the class described having, in combination, means for working an upper over a last, operating mechanism, and means arranged to be operated by said mechanism for applying a binder to the shoe to hold the upper in lasted position and for forcing a portion of the binder into the shoe materials to anchor the binder in place.

55. A machine of the class described having, in combination, means for working an upper over the end portion of a last, operating mechanism, and means arranged to be operated by said mechanism for applying a binder about the end of the shoe to hold the upper in lasted position and for forcing the binder into the shoe materials at opposite sides of the shoe to anchor the binder.

56. A machine of the class described having, in combination, means for working an upper into lasted position over the margin of a sole on a last, and means for applying a binder to the shoe to hold the upper in lasted position and for forcing an end portion of the binder into the shoe materials in a direction substantially parallel to the plane of the sole, said binder applying means being constructed to leave said end portion of the binder projecting laterally of the shoe.

57. A machine of the class described having, in combination, means for working an upper into lasted position over the end portion of a last, and power operated means for applying a binder to the shoe to hold the upper in lasted position and for forcing the ends of the binder into the shoe materials at opposite sides of the shoe in directions substantially parallel to the plane of the shoe bottom.

58. A machine of the class described having, in combination, means for working an upper over a last and into the angle between the feather and the rib or shoulder of a sole on the last, operating mechanism, and means connected to said operating mechanism for applying a binder in said angle and for forcing the ends of the binder into the shoe materials in directions substantially parallel to the plane of the sole.

59. A machine of the class described having, in combination, means for working an upper over a last, and automatic means for applying a binder to the shoe to hold the upper in lasted position and for forcing the ends of the binder into the shoe materials.

60. A machine of the class described having, in combination, means for working an upper over the end portion of a last, operating mechanism and means arranged to be operated by said mechanism for applying a binder in holding relation to the upper at the end of the shoe and for then forcing the ends of the binder into the shoe materials at the sides of the shoe.

61. A machine of the class described having, in combination, means for working an upper over the end portion of a last and into the angle between the feather and the rib or shoulder of a sole on the last, operating mechanism, and means arranged to be operated by said mechanism for applying a binder in holding relation to the upper in said angle at the end of the shoe and for then forcing the binder into said angle at the sides of the shoe and driving the ends of the binder into the shoe materials.

62. A machine of the class described having, in combination, means for working an upper over a last and into the angle between the feather and the rib or shoulder of a sole, operating mechanism, and means arranged to be operated by said mechanism for applying a binder in position to hold the upper in said angle and for forcing the ends of the binder through the upper and into said rib or shoulder.

63. A machine of the class described having, in combination, means for working an upper over a last, means for applying a binder to the shoe to hold the upper in lasted position and for forcing an end of the binder into the shoe materials, and mechanism for operating said overworking and binder applying means.

64. A machine of the class described having, in combination, means for working an upper over a last, and binder applying means comprising a driver member for engaging a binder and forcing an end portion of the binder into the shoe materials, and mechanism for imparting driving movement to said member.

65. A machine of the class described having, in combination, means for working an upper over a last, and means for applying to the shoe a toe binder having inturned ends comprising drivers for engaging the binder and forcing said ends into the shoe and mechanism for imparting driving movement to said drivers.

66. A machine of the class described having, in combination, means for working an upper over the forepart of a last, means for tacking the upper to the sole at the opposite sides of the forepart of the last, and means for applying to the shoe a toe binder having inturned ends and for hooking said ends into the upper adjacent to the tacks.

67. A machine of the class described having, in combination, means for working an upper over a last, means for applying a binder to the shoe to hold the upper in lasted position and for forcing an end of the binder into the shoe, and means for inserting a fastening in the shoe in such relation to the binder as to prevent said end from being withdrawn from the shoe by the strain of the upper materials.

68. A machine of the class described having, in combination, means for working an upper into lasted position about the end of a last and over the margin of a sole on the last, means for applying a binder about the upper at the end of the shoe and for forcing the ends of the binder into the shoe materials in directions substantially parallel to the plane of the sole, and means for driving fastenings in position to hold portions of the upper adjacent to the ends of the binder against lateral outward strain.

69. A machine of the class described having, in combination, means for tensioning an upper forwardly over the forepart of a last and transversely across the last, means for working the tensioned upper over the margin of a sole on the last, means for applying a binder about the toe portion of the upper on the margin of the sole and for forcing the ends of the binder into the shoe materials at the sides of the shoe to hold the upper from relaxing forwardly over the toe, and means for driving fastenings to hold the transversely tensioned upper from relaxing laterally outward at the sides of the shoe.

70. A machine of the class described having, in combination, means for tensioning an upper forwardly over the forepart of a last and transversely across the last, means for wiping the upper over the margin of a sole on the last, means for applying a binder about the upper on the margin of the sole to hold the upper in lasted position and for forcing the ends of the binder into the shoe materials at the sides of the forepart in directions substantially parallel to the plane of the sole, and means for driving fastenings through the upper and into the sole in position to hold portions of the upper adjacent to the ends of the binder from relaxing outwardly.

71. A machine of the class described having, in combination, means for working an upper over a last and into the angle between the feather and the rib or shoulder of a sole on the last, means for applying a binder to hold the upper in said angle and for forcing the ends of the binder through the upper and into said rib or shoulder, and means for driving fastenings through the upper and into the sole in position to prevent the ends of the binder from being pulled laterally outward from said rib or shoulder by the strain of the upper.

72. A machine of the class described having, in combination, means for working an upper over the end portion of a last and for positioning a wire binder in end embracing relation to the shoe, and additional power driven means for forcing an end portion of the binder into the shoe materials.

73. A machine of the class described having, in combination, means for working an upper over the end portion of a last and for positioning a wire binder in end embracing relation to the shoe, and means operated in time relation to said over-working means for forcing the ends of the binder into the shoe materials.

74. A machine of the class described having, in combination, means for working an upper over the end portion of a last, and means for applying and anchoring a binder to the shoe comprising members mounted for swinging movement toward the sides of the shoe independently of said over-working means about axes at the toe end of the shoe to force portions of the binder into the shoe materials.

75. A machine of the class described having, in combination, means for working an upper over the end portion of a last and for positioning a binder in end embracing relation to the shoe, and means pivoted substantially in front of the end of the shoe to swing toward the sides of the shoe for forcing the ends of the binder into the shoe materials.

76. A machine of the class described having, in combination, means for working an upper over the end portion of a last and for positioning a binder in end embracing relation to the shoe, driver members mounted for swinging movement toward the sides of the shoe about axes at the toe end of the shoe to force the ends of the binder into the shoe materials, and means for operating said driver members.

77. A machine of the class described having, in combination, wipers for working an upper over the end portion of a last and into the angle between the feather and the rib of a sole, and means for applying a binder in said angle to hold the upper in lasted position comprising driver plates mounted for swinging movement about axes at the toe end of the shoe over the margin of the sole and toward said rib, said plates having their binder engaging edges curved in substantial conformity to the curve of the edges of said wiper.

78. A machine of the class described having, in combination, end lasting wipers for working an upper over the margin of a sole on a last, means for positioning a binder under the upper engaging faces of said wipers, and means for forcing the ends of the binder into the shoe materials.

79. A machine of the class described having, in combination, end lasting wipers for working the toe of an upper over the margin of a sole on a last, means for holding a binder under the upper engaging faces of said wipers and for carrying the binder around the toe with the wipers, and means for forcing the ends of the binder into the shoe materials.

80. A machine of the class described having, in combination, end lasting wipers for working an upper over the margin of a sole on a last, means for positioning a binder contiguous to the overwiping faces of said wipers, and means movable along said faces to force the ends of the binder into the shoe materials.

81. A machine of the class described having, in combination, end lasting wipers for working an upper over the margin of a sole on a last, means for positioning a binder contiguous to the overwiping faces of said wipers, and members mounted for swinging movement along said faces inwardly toward the sides of the shoe to force the ends of the binder into the shoe materials.

82. A machine of the class described having, in combination, end lasting wipers for working an upper over the margin of a sole on a last, means for positioning a binder contiguous to the overwiping faces of said wipers, and means pivoted on said wipers for forcing the binder into holding relation to the shoe.

83. A machine of the class described having, in combination, end lasting wipers for working an upper over the margin of a sole on a last, binder applying members pivoted on said wipers for movement to force the ends of the binder into the shoe materials, and means for operating said members.

84. A machine of the class described having, in combination, end lasting wipers for working an upper over the margin of a sole on a last, means for positioning a binder in close relation to the edges of said wipers at the end of the shoe prior to the operation of the wipers on the shoe with portions of the binder at the sides of the shoe retracted from said edges, means for operating the wipers and for simultaneously forcing the binder into holding position at the end of the shoe, and means for subsequently forcing said side portions of the binder toward the edges of the wipers and into holding relation to the shoe materials.

85. A machine of the class described having, in combination, end lasting wipers for working an upper over the margin of a sole on a last, means for positioning a wire binder having inturned ends under said wipers with the intermediate portion of the binder in close relation to the edges of said wipers at the end of the shoe and the inturned ends retracted from said edges, means for operating the wipers and for forcing the binder into holding position at the end of the shoe, and means for forcing said inturned ends into the shoe materials.

86. A machine of the class described having, in combination, end lasting wipers, means for moving said wipers lengthwise of a shoe to crowd the upper into the angle between the feather and the rib of the sole at the end of the shoe and for closing them to crowd the upper likewise into said angle at the sides of the shoe, means for positioning a binder relatively to said wipers to cause it to be applied in holding relation to the upper in said angle at the end of the shoe by the movement of the wipers lengthwise of the shoe, and means movable between said wipers and the portion of the upper on the feather of the sole for forcing the binder into holding relation to the upper at the sides of the shoe.

87. A machine of the class described having, in combination, end lasting wipers, means for moving said wipers lengthwise of a shoe to crowd the upper into the angle between the feather and the rib of the sole at the end of the shoe and for closing them to crowd the upper likewise into said angle at the sides of the shoe, binder applying members movable with said wipers and arranged relatively thereto to cause a binder having inturned ends to be forced into holding relation to the upper at the end of the shoe by the movement of the wipers lengthwise of the shoe while the inturned ends of the binder at the sides of the shoe are retracted from the edges of the wipers, and means for operating said members to force the side portions of the binder into holding relation to the upper and to force said ends into the shoe.

88. In a machine of the class described, the combination with end lasting wipers, of binder applying members mounted for movement between the wipers and the surface of the upper on the margin of the sole of the shoe, said members being arranged relatively to the edges of the wipers to admit the inturned ends of a wire binder retracted from said edges and to force said ends into the shoe.

89. In a machine of the class described, the combination with end lasting wipers, of binder applying members pivoted for inward movement between said wipers and the surface of the upper on the margin of the sole of the shoe, and mechanism for operating said members in time relation to the operation of the wipers.

90. In a machine of the class described, the combination with end lasting wipers, of binder applying members mounted on said wipers with their binder engaging portions close to the intermediate portion of the wiping edges of the wipers, and means automatically operative to position said members normally in retracted relation to other portions of said wiping edges.

91. In a machine of the class described, the combination with end lasting wipers, of binder applying members associated with said wipers and having binder engaging edges curved in substantial conformity to the curve of the wiping edges of the wipers, and means for positioning said members normally with their binder engaging edges in non-parallel relation to the edges of the wipers.

92. In a machine of the class described, the combination with end lasting wipers, of binder applying members pivoted on said wipers for swinging movement toward or from the wiping edges, and means automatically operative to hold said members normally retracted relatively to said wiping edges.

93. In a machine of the class described, the combination with end lasting wipers, of binder applying members pivotally mounted for swinging movement toward or from the wiping edges, spring means tending to swing said members back from the wiping edges, and a pin and slot connection between said members and the wipers for limiting said swinging movement.

94. In a machine of the class described, the combination with end lasting wipers and means for operating said wipers, of means for supporting a binder in position to be applied to the end of a shoe by the operative movement of the wipers comprising a member mounted adjacent to the intermediate portion of the wiping edges of the wipers in position to engage the end of the shoe, and yielding means for holding said member normally projected in front of said wiping edges.

95. A machine of the class described having, in combination, end lasting wipers, a wiper carrier on which said wipers are mounted, means for moving said carrier toward the end of a shoe to cause the wipers to wipe the upper over the margin of the sole, a member mounted on said carrier for supporting a binder in position to be applied to the end of the shoe by the operative movement of said wipers, said member being arranged to engage the end of the shoe, and a yielding connection between said member and the carrier to permit the wipers to close over the margin of the sole after said member has engaged the shoe.

96. A machine of the class described having, in combination, end lasting wipers, a wiper carrier on which said wipers are mounted, means for moving said carrier toward the end of a shoe to cause the wipers to wipe the upper over the margin of the sole, and means on said carrier constructed and arranged to extend along the opposite sides of the shoe for supporting a wire binder adjacent to the upper engaging faces of said wipers during the operation of the wipers, said supporting means being yieldable against the pressure of the shoe to permit the wipers to close over the shoe while said means is held against the shoe in position to guide the binder in its subsequent movement toward holding position.

97. A machine of the class described having, in combination, end lasting wipers, means arranged to engage the lateral surface of a shoe in substantial conformity to the contour of said surface for guiding a wire binder into holding relation to the shoe materials, and means movable between said wipers and guiding means for forcing the binder into holding position.

98. A machine of the class described having, in combination, end lasting wipers, means arranged to engage the lateral surface of a shoe at the opposite sides for supporting the inturned ends of a wire binder during the operation of the wipers, and means movable between said wipers and supporting means for forcing the ends of the binder into the shoe materials.

99. A machine of the class described having, in combination, end lasting wipers, means arranged to embrace the end portion of a shoe in substantial conformity to its lateral surface, said means being spaced from the wipers a distance substantially equal to the thickness of a wire binder to permit a binder to be placed therebetween, and means for forcing the binder into holding relation to the shoe materials.

100. A machine of the class described having, in combination, end lasting wipers, means arranged to embrace the end portion of a shoe in engagement with its lateral surface, said means being spaced from the wipers for the reception of a wire binder having inturned ends, drivers mounted for movement between said wipers and end embracing means, and means for operating the drivers to force the ends of the binder into the shoe materials.

101. A machine of the class described having, in combination, end lasting wipers, members arranged to engage the lateral surface of the upper about the end portion of a shoe, and means for relatively positioning said members and the wipers in spaced relation to permit a shoe binder to be inserted between said wipers and members in position to be guided by said members.

102. A machine of the class described having, in combination, end lasting wipers, members arranged to engage the lateral surface of the upper about the end portion of a shoe, means for relatively positioning said members and the wipers in spaced relation to permit a shoe binder to be inserted between them in position to be guided by said members, and yieldable means for holding said members against the shoe.

103. A machine of the class described having, in combination, end lasting wipers, members pivoted on said wipers for engagement with the lateral surface of the upper about the end portion of a shoe, means for relatively positioning said members and the wipers in spaced relation to permit a shoe binder to be inserted between them, and yielding connections between said members and wipers tending to swing the members toward the wiping edges of the wipers.

104. A machine of the class described having, in combination, end lasting wipers, members mounted on said wipers for engagement with the lateral surface of the upper of a shoe, driver plates between said members and the wipers for forcing the ends of a wire binder into the shoe, said members and plates having slots therein, pins on the wipers extending through said slots, and springs tending to force said members inwardly and the driver plates outwardly to the limits determined by said pins.

105. A machine of the class described having, in combination, end lasting wipers, members arranged to engage the lateral surface of the upper about the end portion of a shoe, said members being spaced from the wipers to permit a wire binder to be inserted therebetween, drivers movable between said members and wipers for forcing the binder into holding relation to the lasted upper, and means for preventing relative separating movement of said members and wipers in a direction transverse to the plane of the shoe bottom.

106. A machine of the class described having, in combination, means for working an upper into lasted position about an end portion of a shoe, and means for applying a binder to the shoe to hold the upper in lasted position, said binder applying means comprising members constructed and arranged for movement laterally of the shoe toward the opposite sides of the shoe to force the binder into holding relation to the upper and mechanism for moving said members yieldingly inward to apply the binder to the shoe.

107. A machine of the class described having, in combination, means for working an upper into lasted position about an end portion of a shoe, and means for applying a binder to the shoe and for forcing its ends into the shoe to hold the upper in lasted position, said binder applying means comprising driver plates movable toward opposite sides of the shoe with provision for relative yield between said plates and other portions of said applying means in conformity to shoes of different widths.

108. A machine of the class described having, in combination, means for working an upper into lasted position about an end portion of a shoe, and means for applying a binder to the shoe to hold the upper in lasted position, said binder applying means comprising members movable laterally of the shoe at its opposite sides over the surface of the lasted upper, and means for operating said members each independently of the other to move them toward the shoe.

109. A machine of the class described having, in combination, means for working an upper into lasted position about an end portion of a shoe, and means for applying a binder to the shoe to hold the upper in lasted position, said binder applying means comprising members movable laterally of the shoe toward its opposite sides, and means for applying a predetermined inward pressure to each of said members to force the binder into holding position.

110. A machine of the class described having, in combination, means for working an upper into lasted position about an end portion of a shoe, and means for applying a binder to the shoe to hold the upper in lasted position, said binder applying means comprising power operated members movable laterally of the shoe to force the binder into place and controlling mechanism constructed and arranged to bring substantially equal inwardly directed pressures to bear upon the binder at the opposite sides of the shoe irrespective of the width of the shoe.

111. A machine of the class described having, in combination, means for working an upper into lasted position about an end portion of a shoe, and means for applying a binder to the shoe to hold the upper in lasted position comprising members movable independently of each other to force the ends of the binder into the shoe materials at the opposite sides of the shoe, and means for applying a predetermined pressure to each of said members to force the binder into holding position.

112. A machine of the class described having, in combination, means for working an upper into lasted position about an end portion of a shoe, and means for applying a binder to the shoe to hold the upper in lasted position, said binder applying means comprising opposite side portions constructed and arranged to engage the binder substantially from the end of the shoe rearwardly and movable laterally of the shoe toward the opposite sides of the shoe to force the binder into holding relation to the upper, operating means, and independently yieldable connections between said operating means and the opposite side portions of the binder applying means.

113. A machine of the class described having, in combination, means for working an upper into lasted position about an end portion of a shoe, and means for applying a binder to the shoe to hold the upper in lasted position, said binder applying means comprising driver members movable to force portions of the binder at opposite sides of the shoe into holding relation to the upper, operating means, and connections between said driver members and the operating means so constructed as to give way when the driver members encounter predetermined resistance.

114. A machine of the class described having, in combination, means for working an upper into lasted position about an end portion of a shoe, and means for applying a binder to the shoe to hold the upper in lasted position, said binder applying means comprising driver members movable in engagement with the binder substantially from the toe end of the shoe rearwardly to force portions of the binder at opposite sides of the shoe into holding relation to the upper, operating means, and connections between said driver members and the operating means so constructed as to give way when the driver members encounter predetermined resistance.

115. A machine of the class described having, in combination, means for working an upper into lasted position about an end portion of a shoe, and means for applying a binder to the shoe to hold the upper in lasted position, said binder applying means comprising driver members movable to force portions of the binder at opposite sides of the shoe into holding relation to the upper, operating means, and clutch connections between said driver members and the operating means so constructed as to be released when the driver members encounter predetermined resistance.

116. A machine of the class described having, in combination, a binder applying member constructed and arranged to move laterally of a binder to force it into holding engagement with a shoe, and means for operating said member comprising two relatively movable parts and means for normally preventing relative movement of said parts while permitting such relative movement when the member encounters predetermined resistance through its pressure against the binder.

117. In a machine of the class described, the combination with a binder applying member constructed and arranged to move laterally of a binder to force it into holding engagement with a shoe, of means for operating said member comprising a clutch so constructed as to be released when the member encounters predetermined resistance through its pressure against the binder.

118. In a machine of the class described, the combination, with a binder applying member, of means for operating said member comprising a lengthwise movable rod and a lever and a clutch connecting the rod to the lever, said clutch being constructed to break the connection between the rod and the lever when said member encounters predetermined resistance.

119. A machine for working an upper over a last having, in combination, means for working the toe of the upper into lasted position, and means for applying a binder to the shoe to hold the upper in lasted position, said binder applying means comprising members for forcing the ends of the binder into the shoe materials in substantially parallel relation to the plane of the shoe bottom, said members being constructed to engage the binder substantially continuously from the toe end of the shoe to the end portions of the binder for shaping the binder to the contour of the shoe.

120. A machine for working an upper over a last having, in combination, means for working the toe of the upper into lasted position, and means for applying a binder to the shoe to hold the upper in lasted position, said binder applying means comprising members pivoted substantially at the end of the shoe for movement to force the ends of the binder into the shoe materials at the sides of the shoe, said members being constructed for substantially continuous engagement with the binder from the toe end of the shoe to the end portions of the binder for shaping the binder closely to the contour of the shoe.

121. A machine for working an upper over a last having, in combination, end lasting wipers, means for operating said wipers to cause them to wipe the upper over the margin of the shoe sole, and means for positioning relatively to said wipers a binder to be applied to the shoe, said positioning means being constructed and arranged to limit the closing movement of the wipers by engagement with the lateral surface of the shoe.

122. A machine for working an upper over a last having, in combination, end lasting wipers, means for operating said wipers to cause them to wipe the upper over the margin of the shoe sole, and members connected to said wipers for supporting a binder in position to be applied to the shoe to hold the upper in lasted position, said members being constructed and arranged to limit the closing movement of the wipers by engagement with the sides of the shoe.

123. A machine for working an upper over a last having, in combination, end lasting wipers, means for operating said wipers to cause them to wipe the upper over the margin of the sole of the shoe, members arranged relatively to said wipers for positioning a wire binder having inturned ends to be applied to the shoe, means for positioning said members normally with their end portions relatively close to the wiping edges of the wipers to position the ends of the binder, said members being yieldable outward from said edges through engagement with the shoe, and means for limiting said yield of the members relatively to the wipers to cause the members to limit the extent of the closing movement of the wipers over the shoe bottom.

124. A machine for working an upper over a last having, in combination, shoe positioning means, end lasting wipers, mechanism for operating said wipers to cause them to wipe the upper over the margin of the sole, said wipers being so mounted as to be inclined toward the shoe bottom from the toe end of the shoe toward the rear when they are over said margin, means for positioning a wire binder with its ends adjacent to the ends of said wipers to cause the ends of the wipers to guide the ends of the binder into holding relation to the shoe materials, means for forcing the ends of the binder into the shoe materials, and means for moving said wipers bodily toward the plane of the shoe bottom to cause the ends of the binder to enter the shoe materials close to the feather of the sole.

125. A machine for working an upper over a last having, in combination, shoe positioning means, end lasting wipers, mechanism for operating said wipers to cause them to wipe the upper over the margin of the sole, said wipers being so mounted as to be inclined toward the shoe bottom from the toe end of the shoe toward the rear when they are over said margin, means for positioning a wire binder having inturned ends with the binder adjacent to the upper engaging surface of said wipers and the ends of the binder near the ends of the wipers to cause said surface to guide the ends of the binder into the shoe materials in directions substantially parallel to the plane of the sole, means for forcing said ends into the shoe materials, and means for moving the wipers toward the plane of the sole to cause the ends of the wipers to press the upper upon the margin of the sole and insure engagement of the ends of the binder with the shoe materials close to the feather of the sole.

126. A machine for working an upper over a last having, in combination, end lasting wipers, means for operating said wipers to cause them to wipe the upper over the margin of the sole of the shoe, means arranged to be operated subsequently for applying a binder to the shoe to hold the upper in lasted position, and means for imparting an additional movement to said wipers during the binder applying operation in a direction to press the upper upon the margin of the sole.

127. A machine for working an upper over a last having, in combination, end lasting wipers, means for operating said wipers to cause them to wipe the upper over the margin of the sole of the shoe and against the rib of the sole, means arranged to be operated subsequently for applying a binder to the shoe to hold the upper in the angle between the feather and the rib of the sole, and means for imparting to the wipers a further movement toward the rib of the sole during the binder applying operation.

128. A machine for working an upper over a last having, in combination, end lasting wipers, means for operating said wipers to cause them to wipe the upper over the margin of the sole of the shoe, means for applying a binder to the shoe to hold the upper in lasted position, and means controlled by said binder applying means and automatically operative to impart a movement to the wipers in a direction to press the upper upon the margin of the sole as the binder applying means is operated.

129. A machine for working an upper over a last having, in combination, end lasting wipers, means for operating said wipers to wipe the upper into the angle between the feather and the rib or shoulder of the sole of the shoe, means for applying a binder to the shoe to hold the upper in said angle, and means connected to said binder applying means and automatically operative to impart an additional movement to said wipers to force the upper into said angle as the binder applying means is operated.

130. A machine for working an upper over a last having, in combination, end lasting wipers, means for operating said wipers to wipe the upper over the margin of the sole of the shoe, means for supporting a binder in position to cause it to be forced into holding relation to the overwiped upper at the end of the shoe by the operative movement of the wipers, means for forcing the ends of the binder into the shoe materials at the sides of the shoe, and means for imparting an additional movement to the wipers to tighten the binder round the end of the shoe as said ends are forced into the shoe.

131. A machine of the class described having, in combination, means for wiping an upper into lasted position about an end of a shoe, means for applying a wire binder to the shoe and for driving the ends of the binder into the shoe materials in directions substantially parallel to the plane of the sole, and mechanism for effecting relative movement of said wiping means and the shoe to cause said means to press the upper upon the margin of the sole before said ends are driven.

132. A machine of the class described having, in combination, wipers for lasting an end of a shoe, means for applying a wire binder in the angle between the feather and the rib or shoulder of the sole and for driving the ends of the binder inward toward the rib or shoulder, and mechanism for operating said wipers to tighten the binder about the shoe and to press the upper upon the margin of the sole by movement transversely of the plane of the sole before said ends are driven.

133. A machine of the class described having, in combination, means for working an upper into lasted position about the end portion of a shoe, and means for applying a binder round the end of the shoe to hold the upper in lasted position and for forcing the ends of the binder into the shoe materials at the opposite sides of the shoe, said binder applying means being constructed and arranged to cause the ends of the binder to project laterally of the shoe with an inclination toward the end of the shoe when the binder is in holding position.

134. A machine of the class described having, in combination, means for working an upper into lasted position about the end portion of a shoe, and means for applying a binder round the end of the shoe to hold the upper in lasted position and for forcing the ends of the binder into the rib or shoulder of the sole at opposite sides of the shoe in directions substantially parallel to the plane of the sole, said binder applying means being constructed and arranged to cause the inturned ends of the binder to project laterally of the shoe with an inclination toward the end of the shoe when the binder is in holding position.

135. A machine for working an upper over a last having, in combination, end lasting wipers, means for operating said wipers to wipe the upper over the margin of the sole of the shoe, means for supporting a wire binder having inturned ends in position to cause it to be forced into holding relation to the over-wiped upper at the end of the shoe by the operative movement of the wipers, means for forcing the ends of the binder into the shoe materials at the sides of the shoe, and means for imparting a movement to the wipers in a direction lengthwise of the shoe as said ends are forced into the shoe to tighten the binder and cause the ends of the binder to be bent forwardly toward the end of the shoe.

136. A machine for working an upper over a last having, in combination, end lasting wipers, means for operating said wipers to wipe the upper over the margin of the sole of the shoe and against the rib or shoulder of the sole, means for supporting a wire binder having inturned ends in position to cause it to be forced into holding relation to the over-wiped upper at the end of the shoe by the operative movement of the wipers, means for forcing the ends of the binder into the upper and the rib or shoulder of the sole, and automatically operative means for moving the wipers lengthwise of the shoe as said ends are forced into the shoe to cause the ends of the binder to be bent forwardly toward the end of the shoe.

137. A machine of the class described having, in combination, means for working an upper into lasted position about the end portion of a shoe, and means for applying a binder about the upper and forcing the ends of the binder into the shoe materials at the opposite sides of the shoe and for moving portions of the binder at the sides of the shoe rearwardly as the ends are forced into the shoe to cause said ends to be bent forwardly toward the end of the shoe.

138. A machine of the class described having, in combination, means for wiping an upper over the end portion of a last and into the angle between the feather and the rib or shoulder of a sole on the last, and means for applying a binder in said angle and forcing the ends of the binder into the shoe materials in directions substantially parallel to the plane of the sole and for tightening the binder rearwardly as said ends are forced inward to cause the ends to be bent forwardly toward the end of the shoe.

139. A machine of the class described having, in combination, means for working an upper into lasted position about the end portion of a shoe, means for applying a binder having inturned ends with the intermediate portion of the binder in holding relation to the upper at the end of the shoe, means for forcing the ends of the binder into the shoe materials, and means for operating the binder applying means to tighten the binder rearwardly as said ends are forced inward.

140. A machine for working an upper over a last having, in combination, pulling-over means, mechanism for operating said pulling-over means to tension the upper, overlaying means, mechanism for operating said overlaying means to cause it to assume control of the tensioned upper and to work the upper into lasted position, and automatic means for applying a binder to the shoe to hold the upper in lasted position and for fastening the binder in place.

141. A machine for working an upper over a last having, in combination, pulling-over means, mechanism for operating said pulling-over means to tension the upper, overlaying means, mechanism for operating said overlaying means to cause it to assume control of the tensioned upper and to work the upper into lasted position, and means operative during the operation of said overlaying means to apply a binder to the shoe and to fasten the binder in place.

142. A machine for working an upper over a last having, in combination, pulling-over means, power-operated overlaying means, mechanism for causing said pulling-over means and overlaying means to perform their operations in sequence to pull the upper and to work it into lasted position, and means operative during the operation of said overlaying means to apply a binder to the shoe for holding the upper in lasted position.

143. A machine for working an upper over a last having, in combination, pulling-over means, mechanism for operating said pulling-over means to cause said means to tension the upper and to come to rest while holding the upper under tension to permit relative adjustment of the upper and the last, and means automatically operative subsequently to said pause in the operation of the machine to work into lasted position the tensioned upper and while the lasting pressure is maintained to apply and fasten a binder to the shoe to hold the upper in place.

144. A machine for working an upper over a last having, in combination, pulling-over means, mechanism for operating said pulling-over means to cause said means to tension the upper and to come to rest with the upper under tension to permit relative adjustment of the upper and the last, and means automatically operative subsequently to said pause in the operation of the machine to work the tensioned upper into lasted position and to apply a binder to the shoe and force a portion of the binder into the shoe materials.

145. A machine for working an upper over a last having, in combination, pulling-over means, mechanism for operating said pulling-over means to cause said means to tension the upper and to come to rest while holding the upper under tension to permit relative adjustment of the upper and the last, and means automatically operative subsequently to said pause in the operation of the machine to work the tensioned upper into lasted position and to apply a binder about the end of the shoe and force the ends of the binder into the shoe materials at the opposite sides of the shoe.

146. A machine for working an upper over a last having, in combination, shoe positioning means, overlaying means, power operated mechanism for operating said overlaying means to work the upper into lasted position about an end of the shoe, and means for applying a binder to the shoe in time relation to the operation of said overlaying means to hold the upper in lasted position and for forcing a portion of the binder into the shoe materials.

147. A machine for working an upper over a last having, in combination, shoe positioning means, overlaying means, power operated mechanism for operating said overlaying means to work the upper into lasted position about an end of the shoe, and means automatically operative to apply a binder about the end of the shoe and to force the ends of the binder into the shoe materials.

148. In a machine of the class described, the combination with means for working an upper over the toe portion of a last, of means for holding a binder independently of the shoe, and automatically operating means for applying the binder in position to hold the upper in its over-worked relation to the last and for fastening the binder in holding position.

149. In a machine of the class described, the combination with means for pulling over a shoe upper, of means for working over and fastening the toe portion of the upper in lasted position, said last-named means comprising power driven mechanism for bending a binder about the toe portion of the upper and for connecting the ends of the binder to the shoe.

150. A pulling-over and toe lasting machine having, in combination, means for receiving and holding a binder before a shoe is presented to the machine, means for pulling an upper over a last and for working the toe portion of the upper into lasted position, and power operated mechanism for causing said first-mentioned means to apply the binder in position to hold the upper in lasted relation to the toe portion of the last and to fasten the binder to the shoe while the upper is held in lasted position by the lasting means.

151. In a machine of the class described, end lasting wipers, a support for said wipers, and latching means for detachably securing the wipers on said support to permit different wipers to be mounted in operative position, said means comprising pins slidable lengthwise into and out of latching position and devices for holding said pins yieldingly in both latching position and releasing position.

152. In a machine of the class described, end lasting wipers, a support for said wipers, and means for securing the wipers in operative position on said support, said securing means comprising a pin slidable lengthwise into position to release the wipers and having a head portion constructed and arranged to be engaged by the hand of the operator for effecting its wiper releasing movement, and means for yieldingly retaining said pin in its wiper securing and wiper releasing positions.

153. In a machine of the class described, end lasting wipers, a support for said wipers, and pins for securing said wipers in operative position on the support, said pins being mounted for movement lengthwise into position to release the wipers, and means for limiting the wiper releasing movement of the pins to prevent their detachment from the wiper support.

154. In a machine of the class described, a wiper support, end lasting wipers mounted on said support for closing and opening movements relatively to the support, means movable with the wipers for securing them in operative position, and means stationary against movement with the wipers for operating said securing means in any position of the operative movement of the wipers for releasing the wipers from the support.

155. In a machine of the class described, a wiper support, end lasting wipers mounted on said support for closing and opening movements relatively to the support, members constructed and arranged to secure said wipers in operative position, said members being movable with the wipers, and means on said support having continuous operative engagement with said members in the different positions of the wipers for withdrawing the members from securing position to cause them to release the wipers.

156. In a machine of the class described, a wiper support, end lasting wipers mounted on said support for closing and opening movements relatively to the support, pins for engaging said wipers to secure them in operative position, said pins being movable with the wipers, and members connected to said pins for withdrawing them from operative position, the connections between said members and pins being constructed to permit the pins to move relatively to the members in unison with the wiper movements.

157. In a machine of the class described, a wiper support, end lasting wipers mounted on said support for swinging movements relatively to the support, pins for engaging said wipers to secure them in operative position on the support, and members for engaging said pins to withdraw them from operative position, the connections between said members and pins comprising arc-shaped guideways to permit the pins to move relatively to said members in unison with the wiper movements.

158. In a machine of the class described, a wiper support, wiper holders mounted on said support for movement relatively to the support, wipers mounted on said holders, and means for detachably securing the wipers to the holders comprising pins carried by the holders and engaging the wipers, and manually operative means for withdrawing said pins from the wipers to permit them to be detached from the holders.

159. In a machine of the class described, a wiper support, wiper holders mounted on said support for movement relatively to the support, wipers carried by said holders, and means for detachably securing the wipers to the holders comprising pins carried by the holders for engaging the wipers, and manual means mounted on the support for withdrawing said pins from holding position, the connection between said manual means and the pins being constructed to permit the pins to move relatively to said means.

160. In a machine of the class described, end lasting wipers, a support for said wipers, means for detachably securing the wipers on the support, and means constructed and arranged to co-operate with a portion of the wipers concealed from the operator's view to indicate the correct location of the wipers relatively to said securing means when mounting the wipers in position.

161. In a machine of the class described, end lasting wipers, a support for said wipers, means for detachably securing said wipers on the support comprising pins movable into or out of sockets in the wipers, and means constructed and arranged to catch in the wipers as they slide into position on said support for indicating the correct location of the wipers to cause said sockets to align with the pins.

162. In a machine of the class described, end lasting wipers, a support for said wipers, means for detachably securing the wipers on said support, and members arranged to engage in openings in the edges of the wipers to indicate to the operator the correct relation of the wipers to said securing means.

163. A machine for working an upper over a last having, in combination, pulling-over means, mechanism for operating said means to tension the upper over the last, end lasting means, mechanism for operating said lasting means to cause it to assume control of the tensioned upper and wipe it into lasted position without permitting the tension of the upper to be substantially relaxed, and means for positioning the shoe in such relation to said lasting means as to insure substantial clearance between the lasting means and the plane of the sole at the toe end of the shoe, said positioning means comprising a support for the shoe arranged to engage the shoe upper close to the toe end and means for engaging the margin of the sole on the bottom of the last at the toe end of the sole.

164. In a machine for working an upper over a last, shoe positioning means comprising a sole rest, and automatically controlled means having separated portions for engagement with the top of the forepart of the shoe in locations at different respective distances from the toe end of the shoe to determine the lengthwise inclination of the shoe in the machine.

165. In a machine for working an upper over a last, shoe positioning means comprising a sole rest, and means for supporting the top of the forepart of the shoe, said supporting means comprising members arranged in pairs to cause the different members of each pair to engage the shoe respectively near the toe end and in a location relatively remote from the toe end of the shoe.

166. In a machine for working an upper over a last, the combination with a sole rest, of shoe supporting means comprising members arranged for engagement with the top of the forepart of the shoe in different respective locations lengthwise of the shoe, and a support for said members mounted to rock about an axis extending laterally of the shoe.

167. In a machine for working an upper over a last, the combination with a sole rest, of side clamp arms mounted for movement toward the sides of the shoe, and a pair of shoe supporting members mounted on each of said arms in position to cause said members to engage the shoe at the top of the forepart at points located respectively near the toe end of the shoe and farther backwardly on the shoe.

168. In a machine for working an upper over a last, the combination with a sole rest, of side clamp arms movable toward the sides of the shoe, members mounted on said arms for engagement with the sides of the shoe, a pair of shoe supporting members mounted on each arm for engagement with the shoe at the top of the forepart in locations spaced respectively lengthwise of the shoe, and means for causing said supporting members to be moved to shoe supporting position by the engagement of said side members with the shoe.

169. In a machine for working an upper over a last, the combination with a sole rest, of side clamp arms movable toward the sides of the shoe, a pair of shoe supporting members mounted on each of said arms in position to engage the shoe at the top of the forepart at points located respectively near the toe end of the shoe and farther backwardly along the shoe, and a support for said members pivoted for movement about an axis extending laterally of the shoe.

170. In a machine for working an upper over a last, the combination with toe lasting means and mechanism for operating said means, of means arranged with reference to said lasting means to serve as an abutment for the toe end of the last and movable into and out of position to determine the lengthwise position of the last for the lasting operation.

171. In a machine for working an upper over a last, the combination with end lasting means and mechanism for operating said means, of means arranged to project over the end of the last to position the last in relation to said lasting means, and mechanism for withdrawing said positioning means to permit the operation of the lasting means.

172. In a machine for working an upper over a last, the combination with end lasting means and mechanism for operating said means, of a member constructed and arranged to embrace the end of the last to position it in relation to the lasting means, and mechanism for withdrawing said member from operative position in time relation to the operative movement of the lasting means.

173. In a machine for working an upper over a last, the combination with lasting means having a predetermined range of operative movement toward the end of a last, of a member constructed and arranged to embrace the end of the last to determine the lengthwise position of the last in relation to said lasting means, and mechanism for withdrawing said member from operative position in time relation to the operative movement of the lasting means.

174. In a machine for working an upper over a last, the combination with end lasting means, of means for engaging the edge face of the sole at one end of the last to position the work in relation to said lasting means, and mechanism for swinging said sole engaging means upwardly and backwardly from the end of the last.

175. In a machine for working an upper over a last, the combination with end lasting means and mechanism for operating said means, of a sole rest for determining the position of the last relatively to the plane of movement of the lasting means, means mounted on said sole rest and constructed to project in front of the toe end of the sole on the last to determine the lengthwise position of the sole and the last, and mechanism for withdrawing said positioning means in time relation to the operation of the lasting means.

176. In a machine of the class described, the combination with means for working an upper over a last, of a sole rest for the shoe, and a last positioning member pivoted on said sole rest to swing into or out of position to project in front of the end face of the last.

177. In a machine of the class described, the combination with means for working an upper over a last, of a sole rest, a member pivotally mounted on said sole rest to embrace the end face of the last, and means for swinging said member backwardly from the end of the last to permit the operation of said overworking means.

178. In a machine for working an upper over a last, the combination with pulling-over means and mechanism for operating it to tension the upper at the toe end of the last heightwise of the last, of means arranged for movement into or out of position to project between the edge of the sole and the upper at the toe end of the last to prevent engagement of the upper with the sole during the pulling-over operation.

179. In a machine for working an upper over a last, the combination with pulling-over means, of means for positioning a shoe for the pulling-over operation comprising members arranged to be positioned respectively in abutting relation to the toe end and the heel end of the last to determine the lengthwise position of the last, the toe end member being mounted for movement into or out of operative position.

180. In a machine for working an upper over a last, the combination with pulling-over means, of a member arranged to be positioned in front of the toe end of the last, a heel rest, mechanism for moving said heel rest into operative relation to the last when the last is positioned in operative relation to the toe end member, and means for subsequently withdrawing the toe end member from operative position.

181. In a machine for working an upper over a last, the combination with pulling-over means and mechanism for operating it to tension the upper at the toe end of the last, of a member constructed and arranged to project between the edge of the sole and the upper at the toe end of the last during the upper pulling operation, and mechanism for withdrawing said member from operative position, said member and the pulling-over means being relatively arranged to cause the member to engage the tensioned upper during its withdrawing movement for smoothing out the wrinkles in the upper.

182. In a machine for working an upper over a last, the combination with pulling-over means and mechanism for operating it to tension the upper at the toe end of the last, of a member constructed and arranged to embrace the end face of the last during the upper pulling operation, and mechanism for swinging said member away from the toe end of the last in engagement with the tensioned upper to withdraw said member from operative position while smoothing out the wrinkles of the upper.

183. A machine for working an upper over a last having, in combination, pulling-over means, end lasting means, mechanism for operating said means to pull the upper over the last and to last the forepart of the shoe, means arranged to be positioned in front of the toe end of the sole on the last to position the sole and the last during the pulling-over operation, and mechanism for withdrawing said positioning means from the end of the sole in time relation to the operation of the pulling-over means and the lasting means.

184. In a machine of the class described, the combination with means for working an upper over a last, of a member for engaging the margin of the sole at the end of the last to hold the sole in the correct relation to the last, said member being mounted for swinging movement upwardly and backwardly from the end of the last to withdraw it from operative position.

185. In a machine of the class described, the combination with means for working an upper over a last, of a sole rest, and means mounted on said sole rest for engaging the margin of the sole at the end of the last to hold the sole in the correct relation to the last, said member being pivoted on the sole rest to swing backwardly from the end of the last out of operative position.

186. In a machine of the class described, the combination with means for working an upper over a last, of a member constructed to engage the margin of the sole at the end of the last to hold the margin in the correct relation to the last, said member being mounted for swinging movement out of operative position about an axis extending transversely over the bottom of the last.

187. In a machine of the class described, the combination with means for working an upper over a last, of a sole rest, a member mounted on said sole rest for engagement with the margin of the sole at the end of the last to hold the margin in the correct relation to the last, said member being pivoted on the sole rest for withdrawing movement away from the plane of the sole, and means for withdrawing said member in time relation to the operation of the overworking means.

188. In a machine of the class described, the combination with means for working an upper over a last, of means for engaging the margin of the sole to hold it in the correct relation to the last, mechanism for withdrawing said holding means from operative position, a sole rest, and means on said sole rest for controlling the operation of said withdrawing mechanism.

189. In a machine of the class described, the combination with means for working an upper over a last, of means for engaging the margin of the sole to hold it in the correct relation to the last, spring operated mechanism for effecting a quick withdrawal of said holding means from operative position, a sole rest, and means on said sole rest for controlling the operation of said withdrawing mechanism.

190. In a machine of the class described, the combination with means for working an upper over a last, of means for engaging the margin of the sole to hold it in the correct relation to the last, spring mechanism for effecting a quick withdrawal of said holding means from operative position, a sole rest, and means on said sole rest having a cam surface to control the operation of said spring mechanism.

191. In a machine of the class described, the combination with means for working an upper over a last, of a sole rest, means pivoted on said sole rest for engaging the margin of the sole on the last to hold the sole in the correct relation to the last, mechanism connected to said holding means for swinging it out of operative position, and cam means on said sole rest for controlling the operation of said mechanism.

192. In a machine of the class described, the combination with means for working an upper over a last, of a sole rest, means pivotally mounted on said sole rest for engagement with the margin of the sole on the last to hold the sole in the correct relation to the last, an operating member connected to said holding means, a spring tending to move said member in a direction to swing the holding means out of operative position, and a guide on the sole rest having portions extending in angular relation to each other for controlling the movement of said member.

193. In a machine of the class described, the combination with means for working an upper over a last, of a sole rest, a member pivoted on said sole rest for engagement with the margin of the sole to hold the sole in the correct relation to the last, said member having a slot therein, mechanism including a pin projecting into said slot for withdrawing said member from holding position, spring means tending to move said pin in a direction to withdraw said member, and means on the sole rest for controlling the movement of the pin.

194. In a machine of the class described, the combination with means for working an upper over a last, of a member for engaging the margin of the sole on the last, mechanism tending to withdraw said member from operative position, controlling means for said mechanism having a portion extending in substantially parallel relation to the plane of the sole to hold the mechanism in position to cause said member to engage the sole and another portion extending in angular relation to said plane to permit the mechanism to withdraw the member from operative position, and means for moving said mechanism relatively to the controlling means to cause the member to be moved into or out of operative position.

195. In a machine of the class described, the combination with means for working an upper over a last, of a sole rest, a member for engaging the margin of the sole on the last, said member being pivoted on the sole rest for movement into or out of operative position, mechanism tending to withdraw said member from operative position, means on the sole rest for controlling the operation of said mechanism, said controlling means having a portion extending in substantially parallel relation to the plane of the sole to hold the mechanism in position to cause said member to engage the sole and another portion extending in angular relation to said plane to permit the mechanism to withdraw the member from operative position, and means for moving said mechanism relatively to the controlling means to cause the member to be moved into or out of operative position.

196. In a machine of the class described, the combination with means for working an upper over a last, of a member for engaging the margin of the sole on the last, said member being pivoted for movement into or out of operative position and having a slot therein extending lengthwise of the shoe in substantially parallel relation to the plane of the sole when the member is in operative position, mechanism engaging in said slot and tending to withdraw the member from operative position, controlling means for said mechanism having a cam surface portions of which extend respectively in substantially parallel relation to the plane of the sole and in angular relation to said plane, and means for moving said mechanism lengthwise of the shoe to cause the member to be moved into or out of operative position.

197. In a machine of the class described, the combination with means for working an upper over a last, of means arranged to project in front of the toe end of the last to determine the lengthwise position of the last, and means for engaging the margin of the sole at the toe end to hold said margin in the correct relation to the last.

198. In a machine of the class described, the combination with means for working an upper over a last, of means arranged to project in front of the last to position the last, means for engaging the margin of the sole at the end of the last to hold the sole in the correct relation to the last, and mechanism for withdrawing said last positioning means and margin engaging means successively from operative position.

199. In a machine of the class described, the combination with means for working an upper over a last, of means arranged to project in front of the last to position the last, means for engaging the margin of the sole at the end of the last to hold the sole in the correct relation to the last, and mechanism for withdrawing said last positioning means from its position at the end of the last and for then withdrawing the margin engaging means from operative position simultaneously with the continued withdrawing movement of the last positioning means.

200. In a machine of the class described, the combination with pulling-over and lasting means and mechanism for operating said means to pull an upper over a last and to last the forepart of the shoe, of means arranged to project in front of the toe end of the last to position the last, means for engaging the margin of the sole at the toe end to position the sole on the last, and mechanism operative in time relation to the operation of said pulling-over and lasting means for withdrawing said last positioning means and sole positioning means from operative position.

201. In a machine of the class described, the combination with means for working an upper over a last, of a sole rest, a member arranged to be positioned at the end of a last to determine the position of the last, a member for engaging the margin of the sole at the end of the last, both said members being pivoted on the sole rest for movement into or out of operative position, and means for withdrawing said last positioning member and margin engaging member successively from operative position.

202. In a machine of the class described, the combination with means for working an upper over a last, of a sole rest, a member arranged to be positioned at the end of a last to determine the position of the last, a member for engaging the margin of the sole at the end of the last, both said members being pivoted on the sole rest for movement into or out of operative position, mechanism tending to withdraw said members from operative position, and means on the sole rest for controlling the operation of said mechanism.

203. A machine of the class described having, in combination, a gripper for engaging an upper on a last, means for moving said gripper and the last in substantially opposite directions to tension the upper, a member arranged to be positioned in front of the end of the last to position the last, and means for causing said member to move with the last in the upper tensioning operation.

204. A machine of the class described having, in combination, a gripper for engaging an upper on a last, means for moving said gripper and the last in substantially opposite directions to tension the upper, a member arranged to be positioned in front of the end of the last to position the last, another member arranged to engage the margin of the sole on the last to position said margin in the correct relation to the last, and means for causing both said members to move with the last in the upper tensioning operation.

205. In a machine of the class described, the combination with means for working an upper over a last into lasted position, of work positioning means constructed and arranged to project over the edge face of the sole on the last, and mechanism automatically operative in time relation to other parts of the machine for withdrawing said work positioning means from operative position.

206. In a machine of the class described, the combination with means for working an upper over a last into lasted position, of work positioning means comprising a member constructed and arranged to project in front of the toe end of the sole on the last, said member being mounted to swing into and out of operative position about an axis extending laterally of the shoe at the rear of the toe end of the shoe.

207. In a machine of the class described, the combination with means for working an upper over a last, of work positioning means comprising a member constructed and arranged to project over the edge face of the sole on the last, means comprising a spring for withdrawing said member from operative position, and means for tripping said spring in time relation to the operation of said overworking means to render the spring effective to withdraw said member.

208. In a machine of the class described, the combination with means for working an upper over a last, of work positioning means comprising a sole rest and a member pivoted on said sole rest to swing into and out of operative position in which it projects over the edge face of the sole, automatic means for swinging said member out of operative position, and means on the sole rest for controlling the operation of said automatic means.

209. In a machine of the class described, the combination with means for working an upper over a last, of a sole rest, and a member for engaging the marginal edge of the sole to position said edge in the correct relation to the bottom of the last, said member being pivoted on the sole rest to swing into and out of operative position.

210. In a machine of the class described, the combination with means for working an upper over a last, of a member for engaging the marginal edge of the sole at one end of the last to position said edge in the correct relation to the bottom of the last, said member being mounted to swing out of its operative position about an axis extending laterally of the shoe between the opposite ends of the last.

211. In a machine of the class described, the combination with means for working an upper over a last, of a member for engaging the marginal edge of the sole at the toe end of the last to position said edge in the correct relation to the bottom of the last, said member being mounted to swing out of operative position about an axis at the rear of the toe, a spring for withdrawing said member from operative position, and means for tripping said spring to render it effective to withdraw the member.

212. A machine of the class described having, in combination, a gripper for engaging an upper on a last, a sole rest, means for moving said sole rest in a direction to cause the upper to be pulled by the gripper, a member for engaging the marginal edge of the sole to position it in the correct relation to the bottom of the last, said member being pivoted on the sole rest to swing into or out of operative position, and means for causing said member to move with the sole rest in the upper pulling operation.

213. In a machine of the class described, the combination with means for working an upper over a last, of work positioning means comprising different portions constructed and arranged respectively to project over the edge face of the sole on the last and to engage the feather of the sole to position it on the bottom of the last.

214. In a machine of the class described, the combination with means for working an upper over a last, of work positioning means comprising different portions constructed and arranged respectively to project over the edge face of the sole on the last and to engage the feather of the sole to position it on the bottom of the last, and mechanism for withdrawing said work positioning means from operative position in time relation to the operation of the over-working means.

215. In a machine of the class described, the combination with means for pulling over and lasting the forepart of an upper on a last, of work positioning means comprising different portions constructed and arranged respectively to project in front of the edge face of the sole at the toe end of the last and to engage the marginal edge of the sole at the toe end to position it on the bottom of the last, and mechanism for withdrawing said work positioning means from operative position.

216. In a machine of the class described, the combination with means for working an upper over a last, of work positioning means comprising different portions constructed and arranged respectively to project in front of the toe end of the sole on the last and to engage the feather of the sole to hold it in the correct relation to the bottom of the last, said work positioning means being pivoted at the rear of the toe end of the shoe for swinging movement into or out of operative relation to the shoe.

217. In a machine of the class described, the combination with means for working an upper over a last, of a sole rest, work positioning means pivoted on said sole rest and comprising different portions constructed and arranged respectively to project over the edge face of the sole and to engage the marginal edge of the sole to position it in the correct relation to the bottom of the last, and means operative in time relation to said overworking means for withdrawing said work positioning means from operative position.

218. In a machine of the class described, the combination with means for working an upper over a last, of work positioning means comprising different portions constructed and arranged respectively to project over the edge face of the sole on the last and to engage the marginal edge of the sole to position it in the correct relation to the bottom of the last, means comprising a spring for withdrawing said work positioning means from operative position, and mechanism for tripping said spring to render it effective to withdraw said means.

219. In a machine of the class described, the combination with shoe positioning means, of a member for laying the margin of the upper over the sole of the shoe, a support for said member mounted to swing about an axis substantially opposite to the bottom of the shoe to operate the member, and means for moving said support also bodily in a direction transverse to the plane of the sole to cause said member to press the margin of the upper against the sole.

220. In a machine of the class described, the combination with shoe positioning means, of an overlaying device movable laterally of the edge of the shoe bottom to lay the margin of the upper over the sole, an eccentric upon which said device is mounted, and means for operating said eccentric to move said device in a direction transverse to the plane of the sole for pressing the margin of the upper against the sole.

221. In a machine of the class described, the combination with shoe positioning means, of a member for laying the margin of the upper over the sole of the shoe, a supporting arm mounted to swing laterally to carry said member over the shoe bottom, and means for moving said arm lengthwise to cause said member to press the margin of the upper against the sole of the shoe.

222. In a machine of the class described, the combination with shoe positioning means, of a member for laying the margin of the upper over the sole of the shoe, and means for imparting to said member a swinging movement inwardly over the sole and a movement of translation toward the sole in time relation to each other for laying the margin of the upper inwardly over the sole and for pressing it against the bottom face of the sole.

223. In a machine of the class described, the combination with shoe positioning means, of a member for laying the margin of the upper over the sole of the shoe, a supporting arm mounted to swing laterally to carry said member over the shoe bottom, and yieldable means for imparting to said arm a lengthwise movement in time relation to its lateral movement.

224. In a machine of the class described, the combination with shoe positioning means, of end embracing wipers, a support for said wipers mounted to swing about an axis substantially opposite to the bottom of the shoe, means for swinging the support about said axis and for closing the wipers over the shoe, and means for moving said support also in a direction transverse to the plane of the shoe bottom to cause the wipers to press the margin of the upper upon the shoe bottom.

225. In a machine of the class described, the combination with shoe positioning means, of end embracing wipers, a supporting arm mounted to swing laterally to carry said wipers over the shoe, and automatic means for moving said arm lengthwise to impart to the wipers a movement of translation for pressing the margin of the upper against the sole of the shoe.

226. In a machine of the class described, the combination with shoe positioning means, of a member for laying the margin of the upper over the sole of the shoe, a support for said member mounted to swing about an axis substantially opposite to the bottom of the shoe to operate the member, a spring on said support tending to tip the member in one direction while permitting it to yield in response to resistance of the shoe materials, and means arranged to cooperate with said spring to determine different normal positions of the member.

227. In a machine of the class described, the combination with shoe positioning means, of an overlaying wiper, a support for said wiper mounted to swing about an axis substantially opposite to the bottom of the shoe to operate the wiper, a spring on said support tending to tip the wiper in one direction, and means for adjusting the angular relation of the wiper to the support against the tension of said spring.

228. In a machine of the class described, the combination with shoe positioning means, of means for pulling the upper of the shoe over the last, means for laying the margin of the upper inwardly over the sole of the shoe, and means for causing said pulling-over means to release the upper in variably timed relation to the operative movement of the overlaying means.

229. In a machine of the class described, the combination with means for positioning a shoe and a last, of a pulling-over gripper, means for effecting relative movement of said gripper and the last to pull the upper, a device for tripping the gripper to cause it to release the upper, means movable inwardly over the shoe bottom to lay the margin of the upper over the sole, and means for operating said tripping device in variably timed relation to the movement of the overlaying means depending upon the distance of the gripper from the plane of the shoe bottom.

230. A machine for working an upper over a last and fastening it by the use of a binder having a projecting portion to anchor it to the shoe comprising, in combination, means for working the upper over the last, and connected means for applying the binder to the shoe and for forcing its projecting portion into the shoe.

231. A machine for working an upper over a last and for fastening it by the use of a binder having projections on its ends to anchor it to the shoe comprising, in combination, means for working the upper over the last, and means for applying the binder round the end of the shoe and for forcing said projections into the opposite side portions of the shoe simultaneously.

232. A machine for working an upper over a last and for fastening it by the use of a binder having at its ends projections forming acute angles with the body of the binder comprising, in combination, means for working the upper over the last, and means for applying the binder to the shoe and for hooking its ends into the shoe.

233. A machine for working an upper over a last having, in combination, upper gripping means, mechanism for effecting relative movement of said gripping means and the last to pull the upper, end embracing wipers, power driven means for moving said wipers lengthwise and laterally of the shoe to wipe the upper over the sole and for causing said gripping means to open and release the upper before the wipers complete their operative movement, and means automatically operative in time relation to the overwiping movement of the wipers to effect relative movement of the wipers and the last in a direction transverse to the plane of the sole to press the upper on the sole.

234. A machine for working an upper over a last having, in combination, upper engaging grippers, end embracing wipers, a sole rest, means for effecting relative movement of said grippers and rest to pull the upper and for causing the grippers then to hold the upper under tension with the machine at rest prior to the operation of the wipers, power driven means for subsequently imparting to the wipers an overwiping movement and for opening the grippers to cause them to release the upper, and means automatically operative in time relation to the overwiping movement of the wipers to effect relative movement of the wipers and the last in a direction transverse to the plane of the sole to press the upper on the sole.

235. A machine of the class described having, in combination, a gripper for engaging and pulling an upper at the toe of a last, wipers mounted for advancing and closing movements about the toe to gather and lay the margin of the upper over the sole of the shoe, mechanism automatically operative in time relation to said movements of the wipers to cause the gripper to release the upper, and additional mechanism automatically operative in time relation to the advancing and closing movements of the wipers to effect relative movement of the wipers and the last in a direction transverse to the plane of the sole to press the margin of the upper upon the bottom face of the sole.

236. A machine of the class described having, in combination, shoe positioning means, end embracing wipers, a support on which said wipers are mounted, means for moving said support lengthwise of the shoe, wiper closing means on said support comprising gearing connections for closing the wipers inward laterally of the shoe, and means arranged to be rendered operative by the movement of the wiper support and to come into play after the beginning of the movement of said support toward the shoe to cause said wiper closing means to close the wipers.

237. A machine of the class described having, in combination, shoe positioning means, end embracing wipers, a support on which said wipers are mounted, means for moving said support lengthwise of the shoe, rack and pinion mechanisms on said support arranged to operate independently of each other to close the respective wipers inward laterally of the shoe, and means arranged to come into play in the course of the movement of said support toward the shoe to cause said mechanisms to initiate the closing movements of the respective wipers at different times.

238. A machine of the class described having, in combination, shoe positioning means, end embracing wipers mounted for movement lengthwise of the shoe and for closing movements laterally of the shoe, and means automatically operative in said lengthwise movement of the wipers to initiate the closing movements of the different wipers at different respective times.

239. In a machine of the class described, the combination with shoe positioning means, of means for pulling the upper of the shoe over the last, means for laying the margin of the upper inwardly over the sole of the shoe, and means automatically operative to cause the pulling means to release the upper at a time in the movement of said overlaying means dependent upon the distance between the pulling means and the last.

240. In a machine of the class described, the combination with shoe positioning means, of an upper pulling gripper, means for imparting upper pulling movement to said gripper, an overlaying device movable toward the shoe, and means arranged for operation in the inward movement of said device to cause the gripper to release the upper including mechanism arranged to be positioned by the gripper in its pulling movement to determine automatically the time of such release.

241. In a machine of the class described, the combination with means for working an upper into lasted position round the end of a shoe, of means automatically operative in time relation to said first named means to apply round the end of the shoe a binder having angled ends and to hook said ends into the shoe.

242. In a machine of the class described, the combination with end embracing wipers and means for operating them to work an upper into lasted position, of means adapted to receive and position a formed binder having angled ends prior to the operation of the wipers, and mechanism arranged to be operated in time relation to the wipers to apply the binder to the shoe and to force its ends into the shoe.

243. In a machine of the class described, the combination with end embracing wipers and means for closing them inward laterally of a shoe, of members arranged to close yieldingly round the end portion of the shoe with the wipers and to position adjacent to the wipers a binder having angled ends, and means arranged to move inwardly between said members and the wipers to force the ends of the binder into the shoe.

244. A machine of the class described having, in combination, pulling-over means and end embracing wipers automatically operative to pull and to wipe an upper into lasted position round the end of a shoe, and means constructed and arranged for operation in time relation to said wipers to apply a binder round the end of the shoe and to force its ends into the shoe.

245. A machine of the class described having, in combination, power driven means for pulling an upper over a last and for working the upper into lasted position round the end of the last, and power driven binder applying means constructed and arranged to apply a binder round the end of the shoe and to force its ends into the shoe.

246. In a machine of the class described, the combination with shoe positioning means, of means for applying a binder round the toe of the shoe to hold the upper in lasted position and for forcing the ends of the binder inwardly in directions laterally of the shoe into position to serve as hooks for retaining the binder in place, and fastening mechanism arranged to insert fastenings at the outer side of the binder adjacent to its ends to assist in holding the binder ends in the shoe materials.

247. In a machine of the class described, the combination with shoe positioning means, of means for applying a binder round the toe of the shoe to hold the upper in lasted position, said binder applying means comprising members at opposite sides of the toe constructed and arranged to force portions of the binder into the shoe to anchor the binder to the shoe, and mechanism for operating said members in time relation.

248. In a machine of the class described, the combination with shoe positioning means, of means for applying round the toe of the shoe a binder having angular end portions, and mechanism for driving fastenings in position to co-operate with the angular end portions of the binder in retaining the binder in place.

249. In a machine of the class described, the combination with shoe positioning means, of means for applying round the toe of the shoe a binder having projecting portions to catch in the shoe materials for anchoring the binder, and mechanism for driving fastenings in such relation to the binder as to assist in preventing the withdrawal of said projecting portions from the shoe materials.

In testimony whereof I have signed my name to this specification.

CHARLES F. PYM.

Certificate of Correction.

It is hereby certified that in Letters Patent No. 1,436,194, granted November 21, 1922, upon the application of Charles F. Pym, of Lynn, Massachusetts, for an improvement in "Machines for Working Uppers Over Lasts," errors appear in the printed specification requiring correction as follows: Page 4, line 73, for the word "wipes" read *wipers;* page 7, line 94, for the word "in" read *is;* page 8, line 24, for the word "position" read *positions,* and line 31, for the word "pinion" read *pinions;* page 12, line 95, for the word "arrangement" read *arrangements;* page 13, lines 63 and 64, claim 6, strike out the word "automatically" and insert the same to follow the word "upper" in line 64; page 15, line 110, claim 28, strike out the article "the", second occurrence, and insert the same to precede the word "wipers" in line 111; same line, after the word "support" insert a comma; and that the said Letters Patent should be read with these corrections therein that the same may conform to the record of the case in the Patent Office.

Signed and sealed this 13th day of February, A. D., 1923.

[SEAL.]

KARL FENNING,
*Acting Commissioner of Patents.*